US008214779B2

(12) United States Patent
Lu

(10) Patent No.: US 8,214,779 B2
(45) Date of Patent: Jul. 3, 2012

(54) MAKING A DISCRETE SPATIAL CORRELATION CONTINUOUS

(75) Inventor: Ning Lu, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 12/946,268

(22) Filed: Nov. 15, 2010

(65) Prior Publication Data

US 2012/0124530 A1 May 17, 2012

(51) Int. Cl.

| | |
|---|---|
| ***G06F 17/50*** | (2006.01) |
| ***G06F 9/455*** | (2006.01) |
| ***G06F 11/22*** | (2006.01) |
| ***G06F 17/18*** | (2006.01) |
| ***G06F 19/00*** | (2006.01) |

(52) U.S. Cl. ........................................ 716/100

(58) Field of Classification Search .................... 716/54, 716/100, 132, 136; 702/179

See application file for complete search history.

(56) References Cited

U.S. PATENT DOCUMENTS

| | | | |
|---|---|---|---|
| 7,212,946 | B1 | 5/2007 | Venkateswaran et al. |
| 7,280,939 | B2 | 10/2007 | Hathaway et al. |
| 2009/0204365 | A1 | 8/2009 | Lu |
| 2009/0204367 | A1 | 8/2009 | Hemmett |

OTHER PUBLICATIONS

Huang, et al., "Stochastic Thermal Simulation Considering Spatial Correlated Within-Die Process Variations", Department of Communications Engineering National Chiao Tung University, pp. 31-36; Proc. Asia and South Pacific Design Automation Conf., 2009.

Ning Lu, "Method of Interpolation and Extrapolation Among Correlated Random Variables", www.ip.com; pp. 1-12; Original Publication date Dec. 14, 2009.

Ning Lu, "Method of Generating Continuous Spatial Correlations", pp. 1-7; retrieved from www.ip.com; Original Publication date Nov. 16, 2009.

*Primary Examiner* — Stacy Whitmore

(74) *Attorney, Agent, or Firm* — Cantor Colburn LLP; Richard Kotulak

(57) ABSTRACT

A mechanism is provided for making a discrete spatial correlation on a 2D grid continuous. The region has given grid points and each of the grid points has its discrete stochastic variable. Additional grid points and associated stochastic variables are established on the boundary and corners of the region. All correlation coefficients are obtained among the given discrete stochastic variables and the additional discrete stochastic variables. For each of two given spatial points whose spatial correlation is needed, a quadrilateral containing it is identified by four grid points, and a stochastic variable for it is expressed as a weighted linear combination of four stochastic variables at four grid points, with four weights being a continuous function of the coordinate of the point. The resulting spatial correlation is a weighted linear combination of multiple discrete correlation coefficients each weight being a continuous function of the coordinates of the two given points.

20 Claims, 9 Drawing Sheets

COMPUTER SYSTEM 12
MEMORY 28
RAM 30
CACHE 32
SYSTEM STORAGE 34
40
42
PROCESSING UNIT 16
18
NETWORK ADAPTER 20
I/O INTERFACE(S) 22
APPLICATION 80
EXTERNAL DEVICES 14
DISPLAY 24

200

200
An arbitrary point x
(x, y)
$p_1$
$(x_1, y_1)$
$\varphi_1 = 0,$
$\theta_1 = 0$
$p_2$
$(x_2, y_2)$
$\varphi_2,$
$\theta_2 = 0$
$p_3$
$(x_3, y_3)$
$\varphi_3,$
$\theta_3$

200

An arbitrary given point x
Vertex 1
Vertex 2
Vertex 3
edge 12
edge 13
edge 23
$(x_1, y_1)$
$\varphi_1 = 0,$
$\theta_1 = 0$
$(x_2, y_2)$
$\varphi_2,$
$\theta_2 = 0$
$(x_3, y_3)$
$\varphi_3,$
$\theta_3$
$(x_4, y_4)$
$\varphi_4$
$\theta_4$
$(x_5, y_5)$
$\varphi_5$
$\theta_5$
$(x_6, y_6)$
$\varphi_6 = \varphi_2 d_{61}/d_{21}$
$\theta_6 = 0$
$(x, y)$

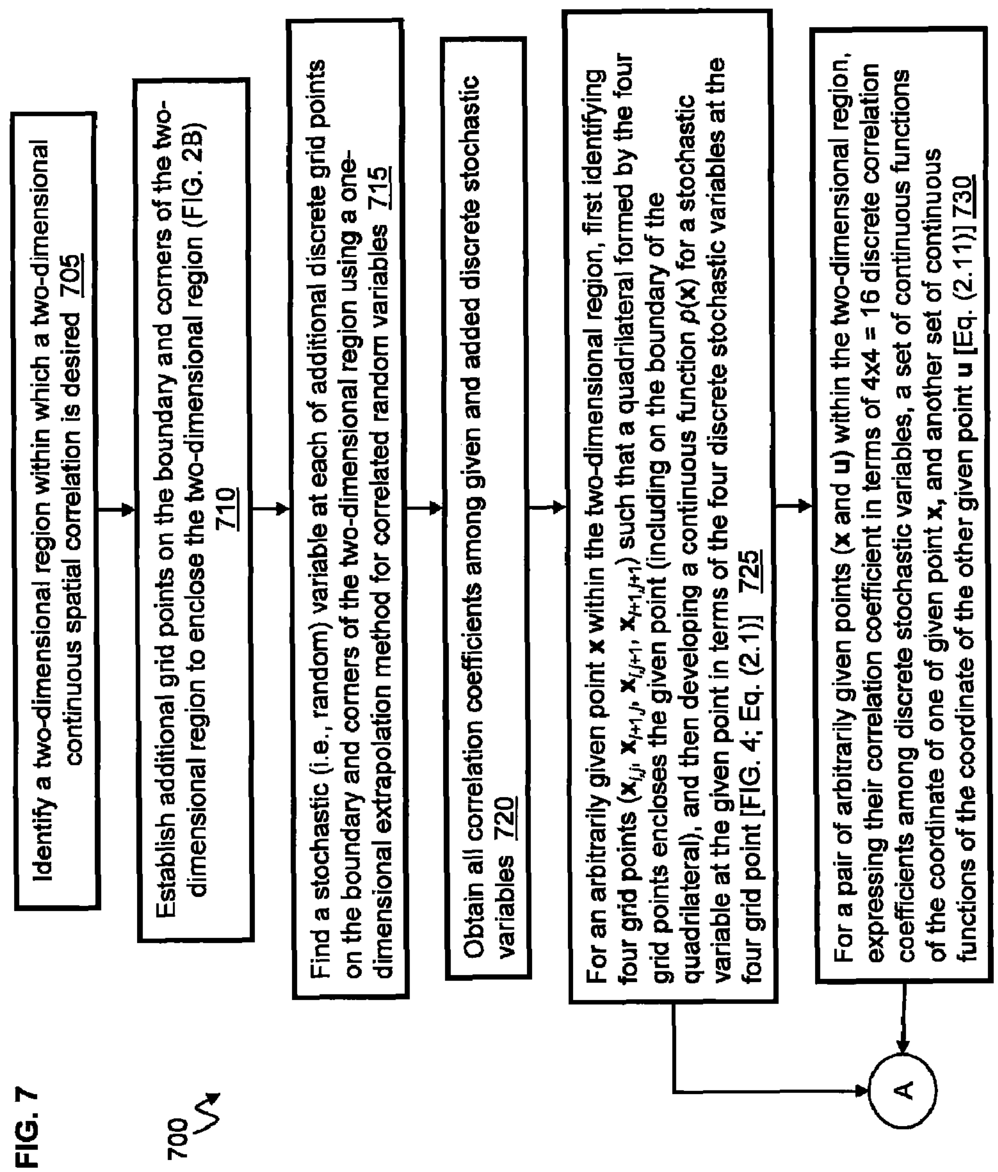
FIG. 7
700
Identify a two-dimensional region within which a two-dimensional continuous spatial correlation is desired 705
Establish additional grid points on the boundary and corners of the two-dimensional region to enclose the two-dimensional region (FIG. 2B) 710
Find a stochastic (i.e., random) variable at each of additional discrete grid points on the boundary and corners of the two-dimensional region using a one-dimensional extrapolation method for correlated random variables 715
Obtain all correlation coefficients among given and added discrete stochastic variables 720
For an arbitrarily given point x within the two-dimensional region, first identifying four grid points ($x_{i,j}$, $x_{i+1,j}$, $x_{i,j+1}$, $x_{i+1,j+1}$) such that a quadrilateral formed by the four grid points encloses the given point (including on the boundary of the quadrilateral), and then developing a continuous function $p(x)$ for a stochastic variable at the given point in terms of the four discrete stochastic variables at the four grid point [FIG. 4; Eq. (2.1)] 725
For a pair of arbitrarily given points (x and u) within the two-dimensional region, expressing their correlation coefficient in terms of 4x4 = 16 discrete correlation coefficients among discrete stochastic variables, a set of continuous functions of the coordinate of one of given point x, and another set of continuous functions of the coordinate of the other given point u [Eq. (2.11)] 730
A

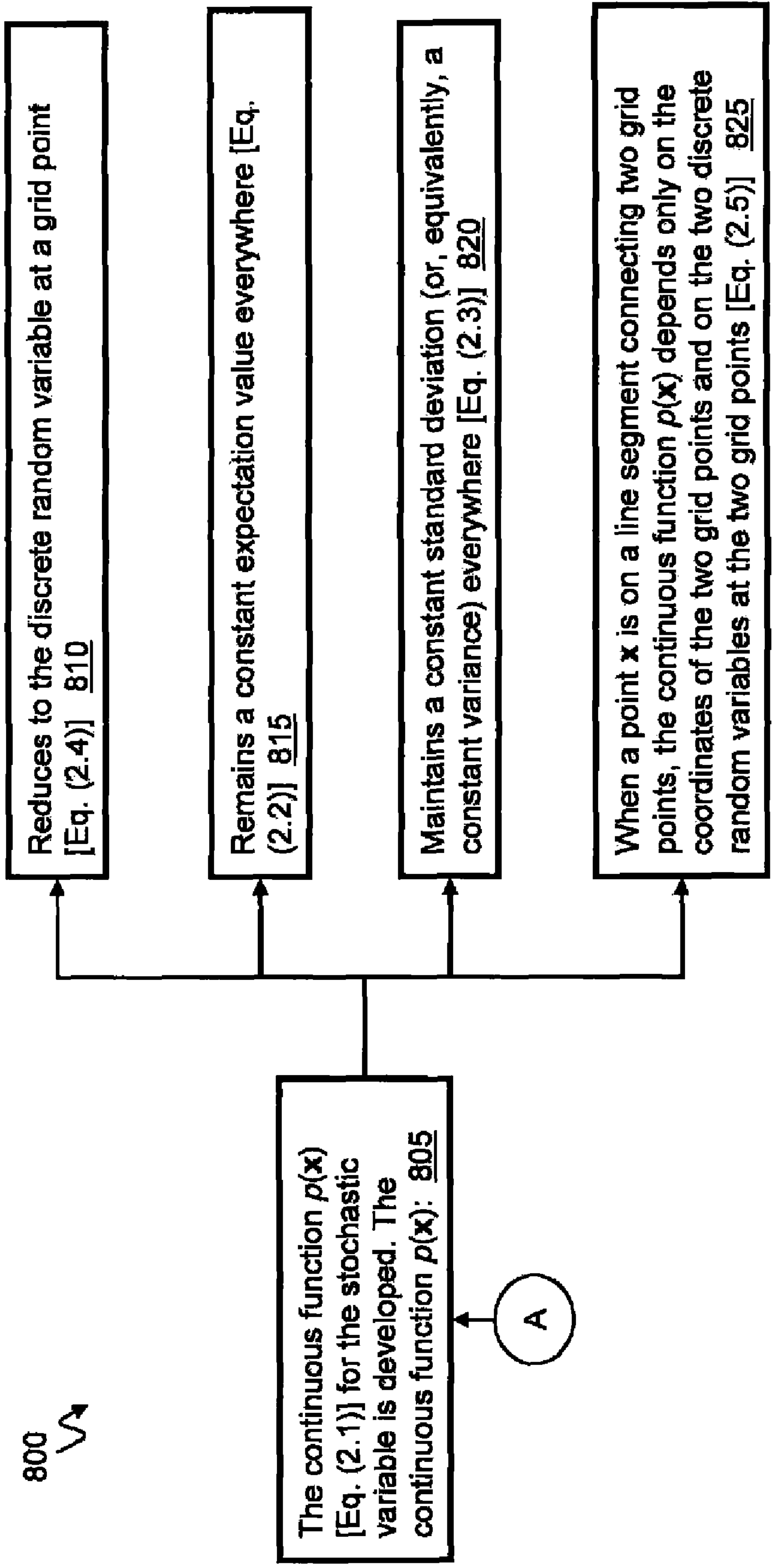
FIG. 8
800
The continuous function p(x) [Eq. (2.1)] for the stochastic variable is developed. The continuous function p(x): 805
A
Reduces to the discrete random variable at a grid point [Eq. (2.4)] 810
Remains a constant expectation value everywhere [Eq. (2.2)] 815
Maintains a constant standard deviation (or, equivalently, a constant variance) everywhere [Eq. (2.3)] 820
When a point x is on a line segment connecting two grid points, the continuous function p(x) depends only on the coordinates of the two grid points and on the two discrete random variables at the two grid points [Eq. (2.5)] 825

MAKING A DISCRETE SPATIAL CORRELATION CONTINUOUS

BACKGROUND

Exemplary embodiments relate to continuous spatial correlation for embedded devices on a chip, and more specifically, to making the discrete correlation for the embedded devices into continuous correlations among the devices.

Wafer fabrication trends are dictating the need for direct understanding of across-chip performance variations: increasing lithography complexity resulting in an alphabet soup of design for manufacturing (DFM) products; and the increasing pattern factor variation between the chip active area and scribe monitoring due to greater functional integration at the chip level for microprocessor manufacturers and to the pressure to deliver functional hardware quickly for foundry manufacturers to win business. Many logic houses routinely embed devices (typically ring oscillators) in the active area and route the embedded devices so that they can be tested at final test as part of their yield/diagnostic strategy. These are measured to understand in-die performance variations resulting from across-chip variations (ACV) of semiconductor process: from photo/etch interactions, copper chemical-mechanical polishing (CMP) dishing and erosion, and other process interactions not observed with "scribe" measurements.

BRIEF SUMMARY

According to exemplary embodiments, a method on a computer is provided for making a discrete spatial correlation defined on a two-dimensional grid continuous. A two-dimensional region is identified within which a two-dimensional continuous spatial correlation is desired, where the two-dimensional region has given grid points and each of the given grid points has its given discrete stochastic variable. Additional discrete grid points are established on the boundary and corners of the two-dimensional region to enclose the two-dimensional region. A stochastic variable (which is a random variable) is found at each of the additional discrete grid points on the boundary and corners of the two-dimensional region using a one-dimensional extrapolation method for correlated random variables, such that each of the additional grid points has a discrete stochastic variable represented as additional discrete stochastic variables. All correlation coefficients are obtained among the given discrete stochastic variables and the additional discrete stochastic variables. A continuous stochastic function is formed by a process for an arbitrarily given point within the two-dimensional region. The process for forming the continuation function includes identifying four grid points such that a quadrilateral formed by the four grid points encloses the arbitrarily given point (including on the boundary of the quadrilateral), and developing the continuous function for a given discrete stochastic variable at the arbitrarily given grid point as a weighted linear combination of the four discrete stochastic variables at the four grid points.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

FIG. 7 illustrates a flow chart in accordance with exemplary embodiments.

FIG. 8 illustrates a block diagram in accordance with exemplary embodiments.

DETAILED DESCRIPTION

Semiconductor process developers or circuit designers often put identical structures (clones) at different locations of a chip, and thus measure discrete values of (distance dependent) mismatch and/or spatial correlations. In semiconductor device and circuit modeling, discrete matching values can be obtained. In statistical static timing analysis (SSTA), discrete spatial correlation can be achieved among discrete grid points. How can one refer from these discrete values of mismatch at different distances or the discrete values of spatial correlations to many other locations where there are no data? Or, how can one interpolate among discrete values of mismatch or spatial correlations to obtain correlations between any two locations on the chip? This disclosure presents a method of making a given discrete spatial correlation continuous, and a method of making a given discrete distance-dependent mismatch relation continuous.

State of the art techniques interpolate between two or more non-correlated random variables. Some state of the art techniques utilize a construction method (i.e., start from constructing a set of non-correlated random variables), and not a method of interpolation among two or more given and correlated random variables.

Exemplary embodiments present a method of converting a given discrete spatial correlation into a continuous spatial correlation, and a method of converting a given discrete mismatch relation into a continuous relation. If a given discrete spatial correlation has a finite correlation range, then the resulting continuous spatial correlation also has a finite correlation range according to exemplary embodiments. The discrete spatial correlation or discrete mismatch relation can be in space or in time or in terms of another parameter.

Figure 1:
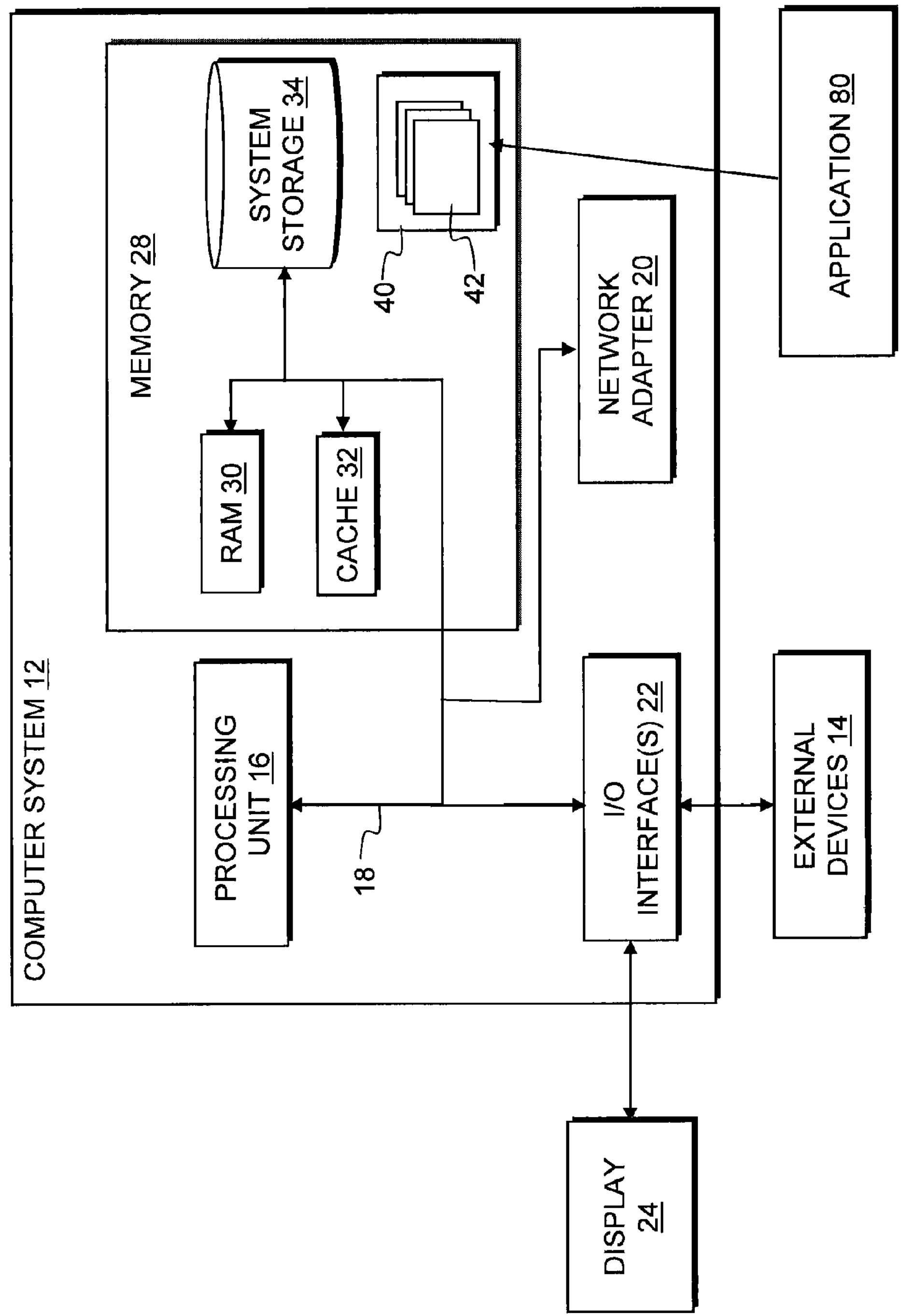
FIG. 1 illustrates a schematic of an example of a computer system in accordance with exemplary embodiments.

Referring now to FIG. 1, FIG. 1 illustrates a schematic example of a computer 12. The computer 12 is only one example of a suitable computing system and is not intended to suggest any limitation as to the scope of use or functionality of exemplary embodiments described herein. Regardless, the computer 12 is capable of being implemented and/or performing any of the functionality set forth herein.

The computer 12 may include and/or represent personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed systems or devices, and the like.

Computer 12 may be described in the general context of computer system executable instructions, such as program modules, being executed by a computer system. Generally, program modules may include routines, programs, objects, components, logic, data structures, and so on that perform particular tasks or implement particular abstract data types. Computer 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the components of computer 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 12 typically includes a variety of computer system readable media. Such media may be any available media that is accessible by computer 12, and it includes both volatile and non-volatile media, removable and non-removable media.

System memory 28 can include computer system readable media in the form of volatile memory, such as random access memory (RAM) 30 and/or cache memory 32. Computer 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer 12 may also communicate with one or more external devices 14 such as a keyboard, a pointing device, a display 24, etc.; one or more devices that enable a user to interact with computer 12; and/or any devices (e.g., network card, modem, etc.) that enable computer 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

If a given discrete spatial correlation is defined on a two-dimensional grid, our method implemented in application 80 makes the discrete spatial correlation continuous on the two-dimensional space. The application 80 may perform the method herein for discrete spatial correlation on a set of two-dimensional grid points to obtain continuous spatial correlation in the two-dimensional region. Additionally and/or alternatively, a user may select a set of two-dimensional grid and establish a discrete spatial correlation among those grid points, and the application 80 then generates a continuous spatial correlation for any pair of points within the two-dimensional region. The continuous spatial correlation function reduces to the discrete spatial correlation function at the grid points.

Section headings and sub-headings are utilized below for explanation purposes and for ease understanding, but the section headings and sub-heading are not meant to limit exemplary embodiments.

A. A given discrete spatial correlation defined on a two-dimensional grid.

Figure 2A:
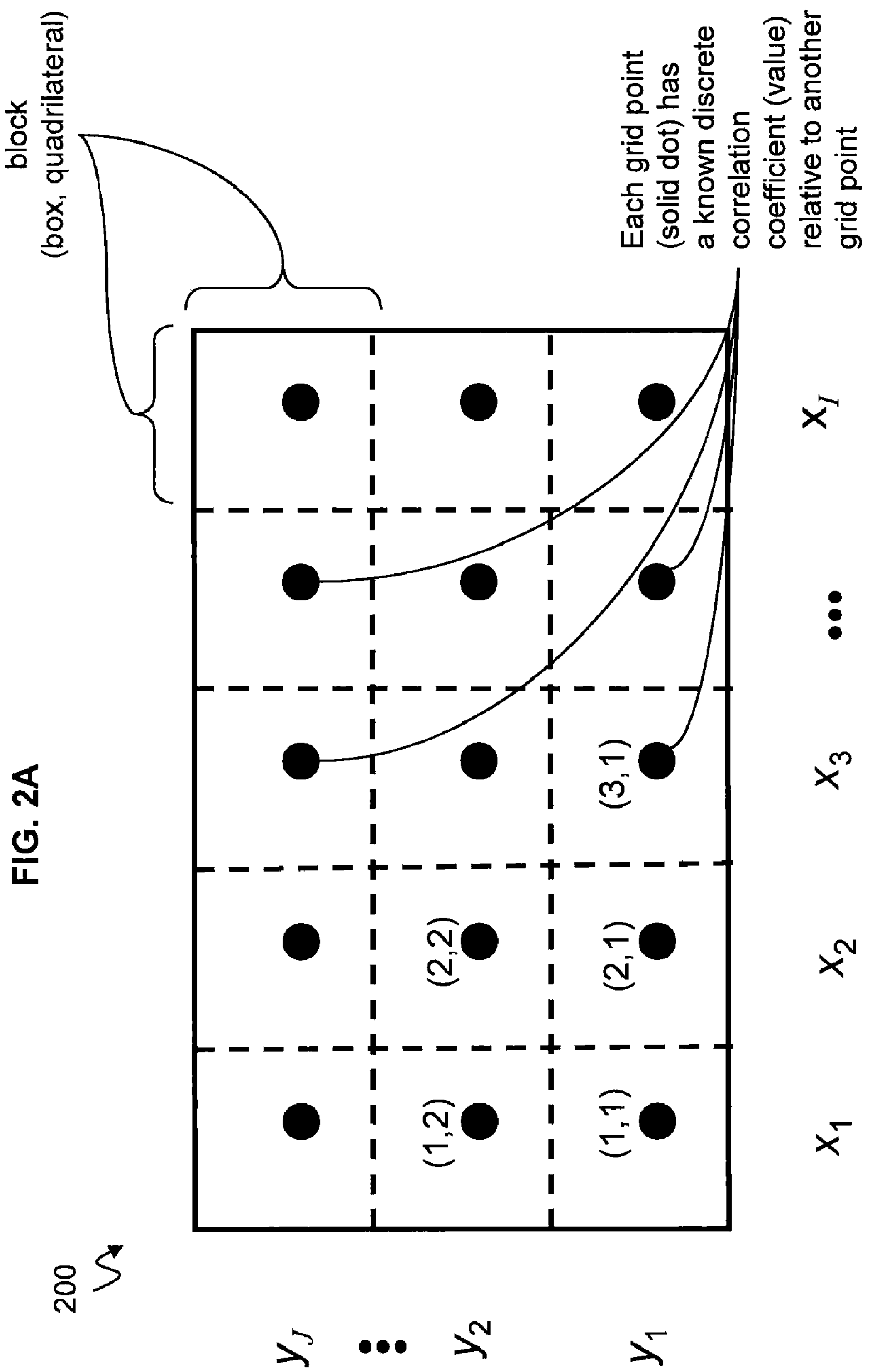
FIG. 2A illustrates correlation values among discrete two-dimensional grid points according to exemplary embodiments.
Figure 2B:
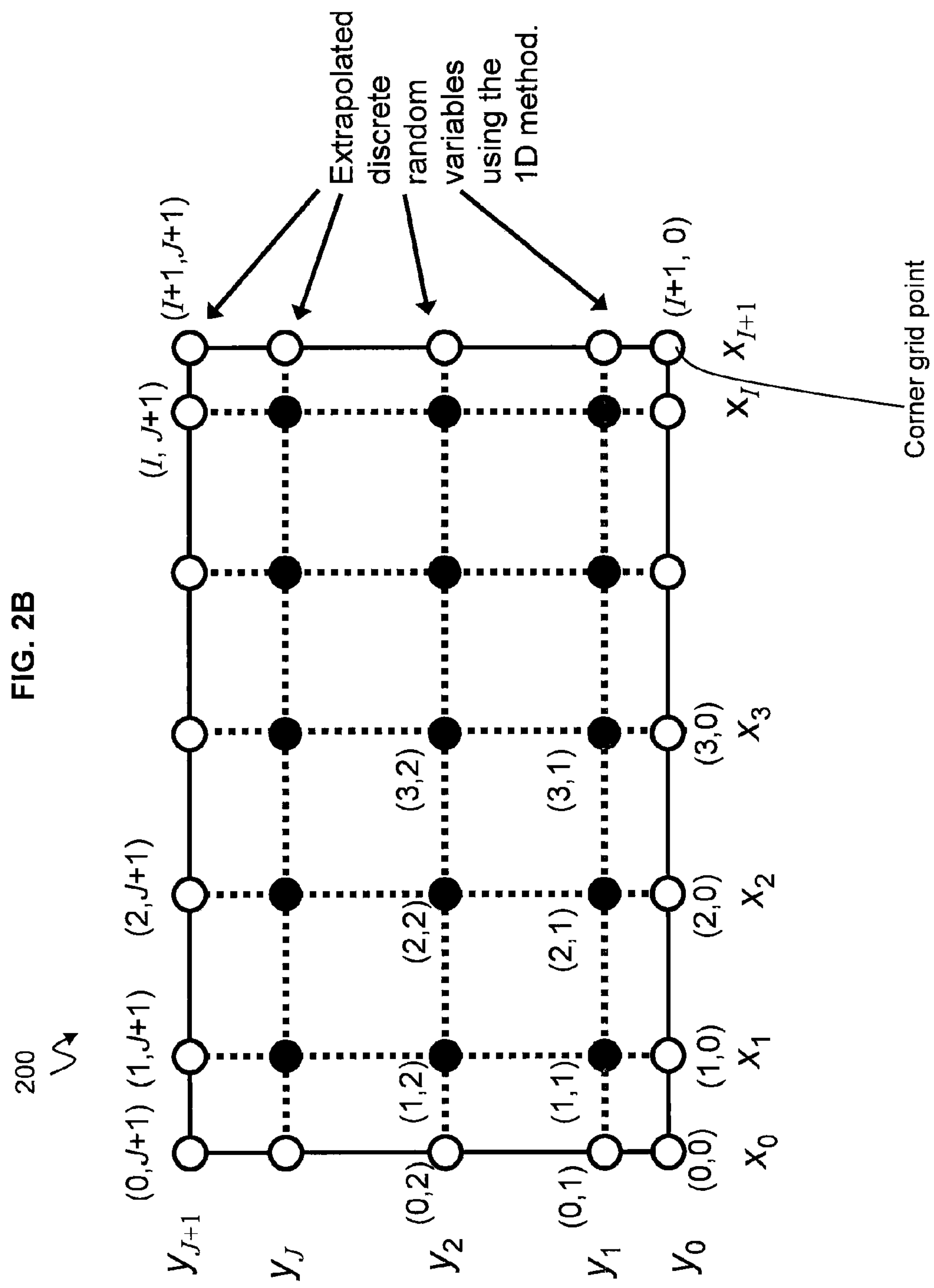
FIG. 2B illustrates extrapolation to create discrete random variables on the boundary of a grid region according to exemplary embodiments.

A two-dimensional region of a wafer 200 is divided into multiple small blocks as shown in FIGS. 2A and 2B. Each small block may comprise a component which is at least one of an embedded device, circuit, a ring oscillator, etc. Each of the calculations performed herein is for respective components formed on the wafer, which may be a thin slice of semiconductor material, such as a silicon crystal, used in the fabrication of integrated circuits and other microdevices. For example, the calculations of exemplary embodiments provide an understanding of in-die performance variations resulting from across-chip variations (ACV) of the semiconductor process. For components in respective small blocks on the wafer 200, application 80 is configured to predict/determine across-chip variations (ACV) by making a discrete spatial correlation at each of the two components at two different points into a continuous spatial correlation between those two components. The continuous spatial correlation between those two components can help predict variations across the wafer 200 (i.e., chip).

On the wafer 200 in FIGS. 2A and 2B, the shape of a small block can be a triangle, quadrilateral, rectangle, square, or hexagon. All random variables within each small block are treated as identical. The spatial correlation between a point in one block and another point in another block stays the same as long as each grid point is within the given block. When one point moves crossing a block boundary entering into a neighboring block, its associated random variable takes the common stochastic variable in that block and the value of the spatial correlation takes a finite change. The spatial correlation as a function of the coordinates of the two points behaves like a step function. Namely, the spatial correlation is discrete and is not continuous everywhere. In other words, each block can be represented by a single point within it and that single point is called a grid point. The point and/or grid point is a component on the wafer 200, and for ease of understanding the components may be referred to as points and/or grid points herein. The spatial correlation between any two points within the two-dimensional region can thus be represented by a finite set of correlation coefficients among grid points. Such a finite set of correlation coefficients among a finite number of points can be measured and characterized and thus are known. As an often encountered example, FIG. 2A illustrates a case in which the shape of each block is a rectangle, and dots in FIG. 2A are grid points (i.e., physical components). For a point in, say, block (1, 1) and another point in, say, block (1, 2), the spatial correlation between them is the same even if one grid point moved closer to the other but both grid points remained in their respective block. The correlation coefficient would not change until one grid point crossed over the border of its small rectangle. Namely, the correlation coefficient jumps from one value to another value when one point crosses over the border of its block. Exemplary embodiments are configured to make the spatial correlation between the two points [one in block (1, 1) and another in block (1, 2)] continuous (i.e., to make the correlation coefficient gradually change as one point moves within its block), such that as one point moves closer to the other point or moves away from the other point, the correlation coefficient gradually changes even though the two points remain in their respective rectangles (blocks). In FIG. 2A, let the grid points of a two-dimensional grid be $x_{i,j}=(x_{i,j},y_{i,j})$, i=1,2,3, . . . , I, j=1,2,3, . . . , J. FIGS. 2A and 2B illustrate making a two-dimensional discrete spatial correlation into a continuous spatial correlation.

In FIG. 2B, a set of additional grid points (open dots) are established on the boundary of the two-dimensional region, and a one-dimensional extrapolation method is used to obtain a discrete random variable for each boundary grid point (open dots in FIG. 2B). One skilled in the art understands a one-dimensional extrapolation method.

At each grid point $x_{i,j}$, a random variable $P_{i,j}$ is given. A set of discrete correlation coefficients among these random variables $P_{i,j}$(i=1,2,3, . . . , I, j=1,2,3, . . . , J) are also given. Each of the random variables $P_{i,j}$ contains its mean value $\langle P_{ij}\rangle$ and various variation components. Examples of those variation components include global/chip-mean/systematic/inter-die/cross-wafer variations (a completely correlated variation component), inter-die/cross-chip variations (ACV) (a partially correlated variation component), and truly random variations (e.g., mismatch among adjacent devices) (a completely uncorrelated variation component). Various variation components are all reflected in each of random variables $P_{i,j}$, their standard deviations $\sigma_{ij}$, and correlation coefficients among them.

Consider a set of given random variables $P_{i,j}$ in which chip-mean ($\sigma_{cm}G_0$), ACV ($\sigma_{acv}p_{i,j}$), and truly random variation ($\sigma_{mm}g_{i,j}$) components are all present and are also separated out, $$P_{i,j}=\mu+\sigma_{cm}G_0+\sigma_{acv}p_{i,j}+\sigma_{mm}g_{i,j},\ i=1,2,3,\ldots,I,\ j=1,2,3,\ldots,J. \tag{0.1}$$

In Equation (0.1), each of $G_0$, $g_{i,j}$(i=1,2,3, . . . , I, j=1,2,3, . . . , J) is an independent stochastic variable, there is no correlation between $G_0$ and any $p_{i,j}$, and there is no correlation between a $p_{i,j}$ and any $g_{m,n}$. Without loss of generality, each of $G_0$, $p_{i,j}$, $g_{i,j}$(i=1,2,3, . . . , I, j=1,2,3, . . . , J) has a zero mean and a standard deviation of one. Namely, separated out variation components in Eq. (0.1) have the following properties:

$$\langle G_0\rangle=\langle g_{i,j}\rangle=0,\ i=1,2,3,\ldots,I,\ j=1,2,3,\ldots,J; \tag{0.2a}$$

$$\langle p_{i,j}\rangle=0,\ i=1,2,3,\ldots,I,\ j=1,2,3,\ldots,J; \tag{0.2b}$$

$$\langle G_0^2\rangle=\langle g_{i,j}^2\rangle=1,\ i=1,2,3,\ldots,I,\ j=1,2,3,\ldots,J; \tag{0.3a}$$

$$\langle p_{i,j}^2\rangle=1,\ i=1,2,3,\ldots,I,\ j=1,2,3,\ldots,J; \tag{0.3b}$$

$$\langle G_0p_{i,j}\rangle=\langle G_0g_{i,j}\rangle=0,\ i=1,2,3,\ldots,I,\ j=1,2,3,\ldots,J; \tag{0.3c}$$

$$\langle p_{i,j}g_{m,n}\rangle=0,\ i,m=1,2,3,\ldots,I,\ j,n=1,2,3,\ldots,J. \tag{0.3d}$$

$$\langle g_{i,j}g_{m,n}\rangle=0,\ i,m=1,2,3,\ldots,I,\ j,n=1,2,3,\ldots,J,\ i\neq m \text{ and/or } j\neq n. \tag{0.3e}$$

The ACV random variables $p_{i,j}$ are partially correlated among themselves, $$c_{i,j;m,n}=\langle p_{i,j}p_{m,n}\rangle,\ i,m=1,2,3,\ldots,I,\ j,n=1,2,3,\ldots,J. \tag{0.4}$$

The mean value of given random variables $P_{i,j}$ in Eq. (0.1) is found by using Equation (0.2), $$\langle P_{i,j}\rangle=\mu,\ i=1,2,3,\ldots,I,\ j=1,2,3,\ldots,J. \tag{0.5}$$

The variance of given random variables $P_{i,j}$ in Eq. (0.1) is obtained after using Equation (0.5) and (0.3), $$\sigma^2\equiv\langle (P_{i,j}-\langle P_{i,j}\rangle)^2\rangle=\sigma_{cm}^2+\sigma_{acv}^2+\sigma_{mm}^2,\quad i=1,2,3,\ldots,I,\ j=1,2,3,\ldots,J. \tag{0.6}$$

The correlation coefficient between a $P_{i,j}$ and another $P_{m,n}$ is found by using Equations (0.5), (0.3), and (0.4), $$C_{i,j;m,n}\equiv\frac{\langle (P_{i,j}-\langle P_{i,j}\rangle)(P_{m,n}-\langle P_{m,n}\rangle)\rangle}{\sigma^2}=\frac{\sigma_{cm}^2+\sigma_{acv}^2c_{i,j;m,n}}{\sigma^2},\quad i,m=1,2,3,\ldots,I,\ j,n=1,2,3,\ldots,J,\ i\neq m \text{ and/or } j\neq n. \tag{0.7}$$

For a device/circuit located at an arbitrary given point x and another device/circuit located at another arbitrary given point u, we find their correlation coefficient C(x, u). More importantly, we make C(x, u) to be a continuous function of both x and u and also make C(x, u) satisfying given discrete spatial correlation (0.7) when x and u are at given grid points. We do this in two stages.

Stage 1. We introduce a continuous stochastic function by making a direct use of both completely correlated variation component and completely uncorrelated variation component, $$P(x)=\mu+\sigma_{cm}G_0+\sigma_{acv}p(x)+\sigma_{mm}h_k,\ k=1,2,3,\ldots, \tag{0.8}$$

for a $k^{th}$ device/circuit having a coordinate x. In Eq. (0.8), each of $h_k$ (k=1,2,3, . . . ) *is* an independent stochastic variable and has a zero mean and a standard *deviation* of *one*, $$\langle h_k\rangle=0,\ k=1,2,3,\ldots; \tag{0.9a}$$

$$\langle h_k^2\rangle=1,\ k=1,2,3,\ldots; \tag{0.9b}$$

$$\langle h_k h_l \rangle = 0,\ k,l = 1,2,3, \ldots, k \neq l; \tag{0.9c}$$

$$\langle G_0 h_k \rangle = 0,\ k = 1,2,3, \ldots; \tag{0.9d}$$

$$\langle p_{i,j} h_k \rangle = 0,\ i = 1,2,3, \ldots, I,\ j = 1,2,3, \ldots, J,\ k = 1,2,3, \ldots. \tag{0.9e}$$

Also in Equation (0.8), p(x) is a continuous stochastic function for the ACV (partially correlated) component of variations. We require that (i) the ACV continuous stochastic function p(x) has a mean zero, $$\langle p(x) \rangle = 0, \tag{0.10a}$$

(ii) p(x) has a standard deviation of one, $$\sigma_P^2 \equiv \langle (p(x) - \langle p(x) \rangle)^2 \rangle = \langle p^2(x) \rangle = 1, \tag{0.10b}$$

(iii) p(x) is a linear combination of ACV random variables $p_{i,j}$ only, $$p(x) = \Sigma z_{i,j}(x) p_{i,j}, \tag{0.10c}$$

(iv) the correlation coefficient between p(x) and p(u), $c(u, x) = c(x, u) \equiv \langle p(x)p(u) \rangle$, is a continuous function of both coordinates x and u, and (v) the correlation coefficient between p(x) and p(u) satisfies the following relations at grid points, $$c(x_{i,j}, u_{m,n}) = c_{i,j;m,n},\ i,m = 1,2,3, \ldots, I,\ j,n = 1,2,3, \ldots, J. \tag{0.10d}$$

Notice that Equations (0.10c) and (0.2b) lead to Equation (0.10a). It follows from Equations (0.10c) and (0.3c) that there is no correlation between $G_0$ and p(x), $$\langle G_0 p(x) \rangle = 0. \tag{0.11a}$$

It follows from Equations (0.10c) and (0.9e) that there is no correlation between p(x) and any $h_k$, $$\langle p(x) h_k \rangle = 0,\ k = 1,2,3, \ldots. \tag{0.11b}$$

When the ACV continuous stochastic function p(x) satisfies requirements (0.10), the stochastic function P(x) in Equation (0.8) also satisfies its needed requirements. These are listed below. (i) Its mean value is found by using Equations (0.2a), (0.10a), and (0.9a), $$\langle P(x) \rangle = \mu, \tag{0.12a}$$

in agreement with its discrete version, Eq. (0.5). (ii) Its variance is found by using Equations (0.12a), (0.11), (0.9), (0.10b), and (0.3), $$\sigma_P^2 \equiv \langle [P(x) - \langle P(x) \rangle]^2 \rangle = \sigma_{cm}^2 + \sigma_{acv}^2 + \sigma_{mn}^2 = \sigma^2, \tag{0.12b}$$

in agreement with its discrete version, Equation (0.6). Notice that Equations (0.12a) and (0.12b) are independent of device index k. (iii) The correlation coefficient between a device at x and another device at u is found from Equations (0.8), (0.12a), (0.9), and (0.11), and (0.3a), $$C(u, x) = \tag{0.13}$$

$$C(x, u) \equiv \frac{\langle [P(x) - \langle P(x) \rangle][(P(u) - \langle P(u) \rangle] \rangle}{\sigma_P^2} = \frac{\sigma_{cm}^2 + \sigma_{acv}^2 c(x, u)}{\sigma_P^2}.$$

Using Equation (0.10d), we see that the correlation coefficient (0.13) at grid points becomes $$C(x_{i,j}, u_{m,n}) = \frac{\sigma_{cm}^2 + \sigma_{acv}^2 c_{i,j;m,n}}{\sigma^2},$$

in agreement with Equation (0.7).

Stage 2. We only need to focus on the ACV stochastic function p(x) and its correlation coefficient c(x, u). We make them to satisfy requirements of Equation (0.10).

For a Manhattan type of grid (e.g., being mapped on the wafer having the wafer components), the grid coordinates $x_{ij} = (x_{ij}, y_{ij})$ can be simplified to $$x_{ij} = x_i,\ i = 1,2,3, \ldots, I,$$

$$y_{ij} = y_j,\ j = 1,2,3, \ldots, J. \tag{1.1}$$

B. Do a one-dimensional extrapolation to obtain multiple random variables at region's boundary.

B1. Find the (x, y) coordinates of extrapolated grid points on four edges and get random variables at these extrapolated grid points using a one-dimensional extrapolation. For a Manhattan grid, their expressions are given below. On the left edge of the region boundary, the coordinates of extrapolated grid points are $$x_{0,j} \equiv (x_{0,j}, y_{0,j}) = (x_0, y_{1,j}) = (x_0, y_j),\ j = 1,2,3, \ldots, J, \tag{1.5}$$

and the random variables at these extrapolated grid points are $$p_{0,j} = \alpha_{1,j}(x_0) p_{1,j} + \beta_{1,j}(x_0) p_{2,j},\ j = 1,2,3, \ldots, J, \tag{1.6}$$

where $$\alpha_{i,j}(x) = \frac{1}{\sin\phi_{i,j}} \sin\left(\phi_{i,j} \frac{x_{i+1} - x}{x_{i+1} - x_i}\right),$$
$$\beta_{i,j}(x) = \frac{1}{\sin\phi_{i,j}} \sin\left(\phi_{i,j} \frac{x - x_i}{x_{i+1} - x_i}\right), \tag{1.7}$$
$$i = 1, 2, 3, \ldots, I-1,$$
$$j = 1, 2, 3, \ldots, J,$$

$$\Phi_{i,j} = \arccos c_{i,j;i+1,j},\ i = 1,2,3, \ldots, I-1,\ j = 1,2,3, \ldots, J. \tag{1.8}$$

It follows from Equations (1.6) and (0.3b) that the mean value of each $p_{0,j}$ is zero, $$\langle p_{0,j} \rangle = 0,\ j = 1,2,3, \ldots, J. \tag{1.9}$$

Using Equations (1.6), (1.7), (1.8), (0.3b), and (0.4), one sees that each of each $p_{0,j}$ is still normalized, $$\langle p_{0,j}{}^2 \rangle = 1,\ j = 1,2,3, \ldots, J. \tag{1.10}$$

On the right edge of the region boundary, the coordinates of extrapolated grid points are $$x_{I+1,j} \equiv (x_{I+1,j}, y_{I+1,j}) = (x_{I+1}, y_{I,j}) = (x_{I+1}, y_j),\ j = 1,2,3, \ldots, J, \tag{1.11}$$

and the random variables at these extrapolated grid points are $$p_{I+1,j} = \alpha_{I-1,j}(x_{I+1}) p_{I-1,j} + \beta_{I-1,j}(x_{I+1}) p_{I,j},\ j = 1,2,3, \ldots, J. \tag{1.12}$$

It follows from Equations (1.12) and (0.3b) that the mean value of each $p_{I+1,j}$ is zero, $$\langle p_{I+1,j} \rangle = 0,\ j = 1,2,3, \ldots, J. \tag{1.13}$$

Using Equations (1.12), (1.7), (1.8), (0.3b), and (0.4), one sees that each of each $p_{I+1,j}$ is still normalized, $$\langle p_{I+1,j}{}^2 \rangle = 1,\ j = 1,2,3, \ldots, J. \tag{1.14}$$

Similarly, on the lower edge of the region boundary, the coordinates of extrapolated grid points are $$x_{i,0} \equiv (x_{i,0}, y_{i,0}) = (x_{i,1}, y_0) = (x_i, y_0),\ i=1,2,3, \ldots, I, \quad (1.15)$$

and the random variables at these extrapolated grid points are $$p_{i,0} = \gamma_{i,1}(y_0) p_{i,1} + \eta_{i,1}(y_0) p_{i,2},\ i=1,2,3, \ldots, I, \quad (1.16)$$

where $$\gamma_{i,j}(y) \frac{1}{\sin\theta_{i,j}} \sin\left(\theta_{i,j} \frac{y_{j+1} - y}{y_{j+1} - y_j}\right), \quad (1.17)$$

$$\eta_{i,j}(y) = \frac{1}{\sin\theta_{i,j}} \sin\left(\theta_{i,j} \frac{y - y_j}{y_{j+1} - y_j}\right),$$

$$i = 1, 2, 3, \ldots, I,\ \ j = 1, 2, 3, \ldots, J-1,$$

$$\theta_{i,j} = \arccos c_{i,j;i,j+1},\ i=1,2,3, \ldots, I, j=1,2,3, \ldots, J-1. \quad (1.18)$$

It follows from Equations (1.11) and (0.3b) that the mean value of each $p_{i,0}$ is zero, $$\langle p_{i,0} \rangle = 0,\ i=1,2,3, \ldots, I. \quad (1.19)$$

Using Equations (1.16), (1.7), (1.8), (0.3b), and (0.4), one sees that each of each $p_{i,0}$ is still normalized, $$\langle p_{i,0}^2 \rangle = 1,\ i=1,2,3, \ldots, I. \quad (1.20)$$

On the upper edge of the region boundary, the coordinates of extrapolated grid points are $$x_{i,J+1} \equiv (x_{i,J+1}, y_{i,J+1}) = (x_{i,J}, y_{J+1}) = (x_i, y_{J+1}),\ i=1,2,3, \ldots, I, \quad (1.21)$$

and the random variables at these extrapolated grid points are $$p_{i,J+1} = \gamma_{i,J-1}(y_{J+1}) p_{i,J-1} + \eta_{i,J-1}(y_{J+1}) p_{i,J},\ i=1,2,3, \ldots, I. \quad (1.22)$$

Similarly, each of ach $p_{i,J+1}$ has a zero mean and is also normalized, $$\langle p_{i,J+1} \rangle = 0,\ i=1,2,3, \ldots, I. \quad (1.23)$$

$$\langle p_{i,J+1}^2 \rangle = 1,\ i=1,2,3, \ldots, I. \quad (1.24)$$

B2: After obtaining the coordinates of extrapolated grid points on four edges and getting random variables at these extrapolated grid points, we next find the (x, y) coordinates of four corners of the region and obtain the random variables at the four corners using the one-dimensional extrapolation formula discussed above. For example, two left corners are $$x_{0,j} \equiv (x_{0,j}, y_{0,j}) = (x_0, y_j),\ j=0, J+1, \quad (1.25)$$

and the random variables at these two left corners are $$p_{0,j} = \alpha_{1,j}(x_0) p_{1,j} + \beta_{1,j}(x_0) p_{2,j},\ j=0, J+1, \quad (1.26)$$

Similarly, two right corners are $$x_{I+1,j} \equiv (x_{I+1,j}, y_{I+1,j}) = (x_{I+1}, y_j),\ j=0, J+1, \quad (1.27)$$

and the random variables at these two right corners are $$p_{I+1,j} = \alpha_{I-1,j}(x_{I+1}) p_{I-1,j} + \beta_{I-1,j}(x_{I+1}) p_{I,j},\ j=0, J+1. \quad (1.28)$$

In Equations (1.26) and (1.28), $$\alpha_{i,j}(x) \frac{1}{\sin\phi_{i,j}} \sin\left(\phi_{i,j} \frac{x_{i+1} - x}{x_{i+1} - x_i}\right), \quad (1.29)$$

$$\beta_{i,j}(x) = \frac{1}{\sin\phi_{i,j}} \sin\left(\phi_{i,j} \frac{x - x_i}{x_{i+1} - x_i}\right),\ i = 1, I-1,\ \ j = 0, J+1,$$

$$\Phi_{i,j} = \arccos\langle p_{i,j} p_{i+1,j} \rangle,\ i=1, I-1, j=0, J+1, \quad (1.30)$$

which are extension of Equations (1.7) and (1.8), respectively. The mean value of each of random variables at the corner is zero, $$\langle p_{i,j} \rangle = 0,\ i=0, I+1, j=0, J+1, \quad (1.31)$$

and each of them is also normalized, $$\langle p_{i,j}^2 \rangle = 1,\ i=0, I+1, j=0, J+1. \quad (1.32)$$

B3. Summarizing expanded grid.

By now, we have obtained an expanded two-dimensional grid $x_{i,j} = (x_{i,j}, y_{i,j})$, i=0,1,2,3, . . . , I, I+1, j=0,1,2,3, . . . , J, J+1 (see FIG. 2B). In FIG. 2B, on the boundary of the whole region of the grid, we first create discrete random variables through extrapolation using the 1D method. Further information regarding interpolation and extrapolation can be found in the technical disclosure "Method of Interpolation And Extrapolation Among Correlated Random Variables" authored by the present inventor Ning Lu, published Dec. 14, 2009 in IP.com Prior Art Database with IP.com Number IPCOM000191065D, the entire contents of which is herein incorporated by reference. Also, the entire contents are herein incorporated by reference for "Method of Generating Continuous Spatial Correlations" authored by the present inventor Ning Lu, published Nov. 16, 2009 in IP.com Prior Art Database with IP.com Number IPCOM000190071D.

At each grid point $x_{i,j}$, a random variable $p_{i,j}$ is known, with a mean zero, $$\langle p_{i,j} \rangle = 0,\ i=1,2,3, \ldots, I, I+1, j=0,1,2,3, \ldots, J, J+1, \quad (1.33)$$

and being also normalized, $$\langle p_{i,j}^2 \rangle = 1,\ i=1,2,3, \ldots, I, I+1, j=0,1,2,3, \ldots, J, J+1. \quad (1.34)$$

The correlation coefficient $c_{i,j;m,n}$ between any two grid points (i,j) and (m, n), $$c_{i,j;m,n} = \langle p_{i,j} p_{m,n} \rangle,\ i,m=0,1,2,3, \ldots, I, I+1, j,n=0,1,2,3, \ldots, J, J+1, \quad (1.35)$$

is also known.

C. Express the random variable at an arbitrary point.

Figure 3:
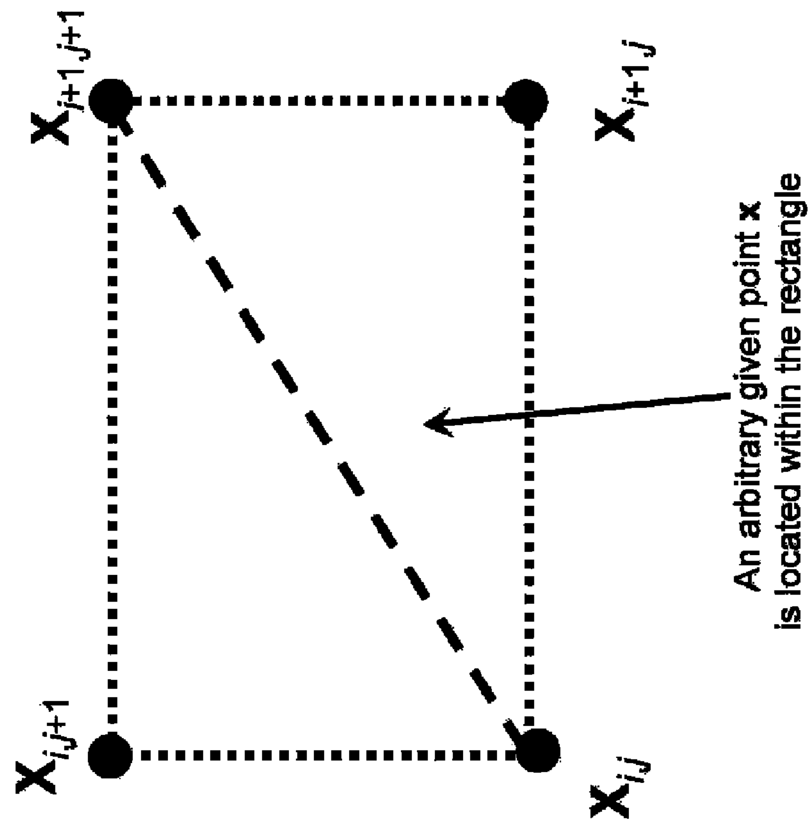
FIG. 3 illustrates how to divide a rectangle into triangles where an arbitrary grid point is located in the rectangle according to exemplary embodiments.

FIG. 3 illustrates how the application 80 can divide a rectangle into 2 triangles where an arbitrary grid point is located in the rectangle. For an arbitrary point x=(x, y) located within a rectangle formed by four adjacent grid points $x_{i,j}$, $x_{i+1,j}$, $x_{i,j+1}$, and $x_{i+1,j+1}$, we can express the stochastic variable p(x) at point x as a weighted linear combination (e.g., four weights) of the four stochastic variables at the four grid points, $$p(x) = A_{i,j}(x) p_{i,j} + B_{i,j}(x) p_{i+1,j} + D_{i,j}(x) p_{i,j+1} + E_{i,j}(x) p_{i+1,j+1},\ x_i \leqq x \leqq x_{i+1},\ i=0,1,2,3, \ldots, I,\ y_j \leqq y \leqq y_{j+1},\ j=0,1,2,3, \ldots, J. \quad (2.1)$$

It follows from Equations (2.1) and (1.33) that the expectation value of p(x) is zero everywhere, $$\langle p(x) \rangle = 0,\ x_i \leqq x \leqq x_{i+1},\ i=0,1,2,3, \ldots, I,\ y_j \leqq y \leqq y_{j+1},\ j=0,1,2,3, \ldots, J. \quad (2.2)$$

Each of the weight functions $A_{i,j}(x)$, $B_{i,j}(x)$, $C_{i,j}(x)$, and $D_{i,j}(x)$ is a continuous function of x. The weight functions $A_{i,j}(x)$, $B_{i,j}(x)$, $C_{i,j}(x)$, and $D_{i,j}(x)$ are carefully constructed such that the stochastic variable function p(x) is also normalized everywhere, $$\langle p^2(x) \rangle = 1,\ x_i \leqq x \leqq x_{i+1},\ i=0,1,2,3, \ldots, I,\ y_j \leqq y \leqq y_{j+1},\ j=0,1,2,3, \ldots, J. \quad (2.3)$$

In addition, the stochastic variable function p(x) reproduces the discrete random variable at each given grid point, $$p(x_{ij}) = p_{ij},\ i=1,2,3, \ldots, I, j=1,2,3, \ldots, J. \quad (2.4)$$

Along an edge of the rectangle, the stochastic variable function p(x) reduces to a simpler form which depends only on the two grid points that form the edge and on the two random variables at the two grid points, $$p(x) = A_{i,j}(x;\ c_{i,j;1+1,j})p_{i,j} + B_{i,j}(x;\ c_{i,j;i+1,j})p_{i+1,j},\quad x = x_{i,j} + \lambda(x_{i+1,j} - x_{i,j});$$
$$p(x) = D_{i,j}(x;\ c_{i,j+1;i+1,j+1})p_{i,j+1} + E_{i,j}(x;\ c_{i,j+1;i+1,j+1})p_{i+1,\ j+1},\quad x = x_{i,j+1} + \lambda(x_{i+1,j+1} - x_{i,j+1});$$
$$p(x) = A_{i,j}(x;\ c_{i,j;i,j+1})p_{i,j} + D_{i,j}(x;\ c_{i,j;i,j+1}),\quad x = x_{i,j} + \lambda(x_{i,j+1} - x_{i,j});$$
$$p(x) = B_{i,j}(x;\ c_{i+1,j;i+1,j+1})p_{i+1,j} + E_{i,j}(x;\ c_{i+1,j;i+1,j+1})p_{i+1,j+1},\quad x = x_{i+1,j} + \lambda(x_{i+1,j+1} - x_{i+1,j});\tag{2.5}$$

with $0 \leqq \lambda \leqq 1$.

These are further explained below.

C1. Each rectangle formed by $x_{i,j}$, $x_{i+1,j}$, $x_{i,j+1}$, and $x_{i+1,j+1}$ is divided into two triangles as shown in FIG. 3. A lower triangle consists of three adjacent grid points, say, $x_{i,j}$, $x_{i+1,j}$, and $x_{i+1,j+1}$, and the other upper triangle is formed by another three adjacent grid points $x_{i,j}$, $x_{i,j+1}$, and $x_{i+1,j+1}$.

C2. For each triangle, we do an interpolation among 3 correlated random variables at three vertices of the triangle.

When x is within the lower triangle formed by $x_{i,j}$, $x_{i+1,j}$, and $x_{i,j+1}$, according to Appendix A [Equation (A3)], $$p(x)=h(x;\ Q_{i,j})p_{i,j}+w(x;\ Q_{i,j})p_{i+1,j}+z(x;\ Q_{i,j})p_{i+1,j+1},\quad Q_{i,j}=\{r_{i,j;i+1,j},\ r_{i,j;i+1,j+1},\ r_{i+1,j;i+1,j+1},\ x_{i,j},\ x_{i+1,j},\ x_{i+1,j+1}\}.\tag{2.6}$$

Further, per Appendix A (which is provided below), $\langle p^2(x)\rangle=1$ everywhere on and within the lower triangle. A comparison between Equations (2.1) and (2.4) reveals that the weight functions are $$A_{i,j}(x)=h(x;\ Q_{i,j}),$$
$$B_{i,j}(x)=w(x;\ Q_{i,j}),$$
$$D_{i,j}(x)=0,$$
$$E_{i,j}(x)=z(x;\ Q_{i,j}),$$
$$x_i \leqq x \leqq x_{i+1},\ i=0,1,2,3,\ \ldots,\ I,$$
$$y_j \leqq y \leqq y_j+(y_{j+1}-y_j)(x-x_j)/(x_{j+1}-x_j),\ j=0,1,2,3,\ \ldots,\ J.\tag{2.7}$$

When x is within the upper triangle, according to Appendix A again, $$p(x)=h(x;\ S_{i,j})p_{i,j}+w(x;\ S_{i,j})p_{i,j+1}+z(x;\ S_{i,j})p_{i+1,j+1},\quad S_{i,j}=\{r_{i,j;i,j+1},\ r_{i,j;i+1,j+1},\ r_{i,j+1;i+1,j+1},\ x_{i,j},\ x_{i,j+1},\ x_{i+1,j+1}\}.\tag{2.8}$$

Also, per the Appendix A, $\langle p^2(x)\rangle=1$ everywhere on and within the upper triangle. By comparing Equation (2.8) with Equation (2.1), one sees that $$A_{i,j}(x)=h(x;\ S_{i,j}),$$
$$B_{i,j}(x)=0,$$
$$D_{i,j}(x)=w(x;\ S_{i,j}),$$
$$E_{i,j}(x)=z(x;\ S_{i,j}),$$
$$x_i \leqq x \leqq x_{i+1},\ i=0,1,2,3,\ \ldots,\ I,$$
$$y_j+(y_{j+1}-y_j)(x-x_j)/(x_{j+1}-x_j) \leqq y \leqq y_{j+1},\ j=0,1,2,3,\ \ldots,\ J.\tag{2.9}$$

D. Find the correlation coefficient between two random variables at any two locations.

Figure 4:
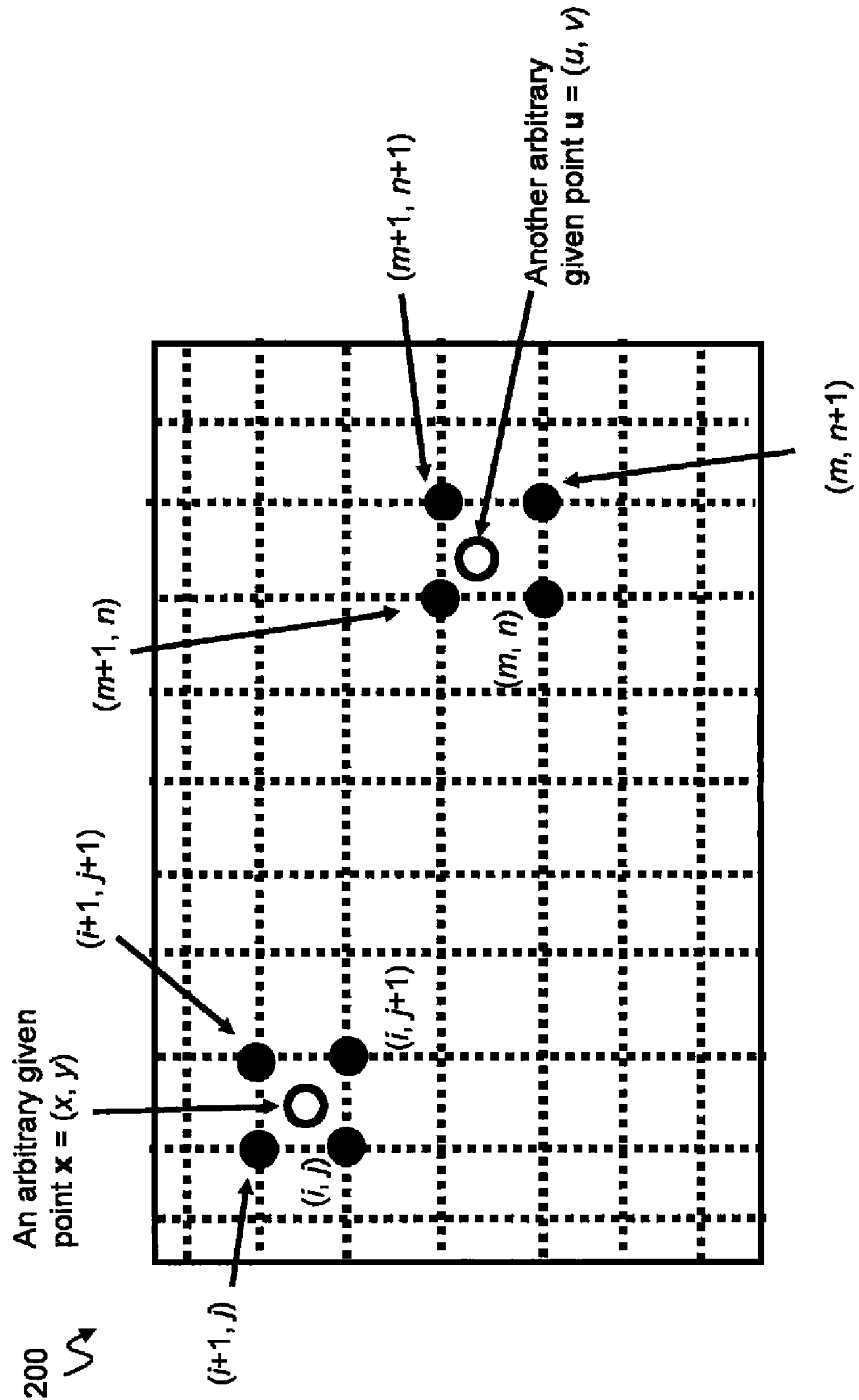
FIG. 4 illustrates expressing a random variable at an arbitrary given point in terms of 4 random variables at 4 grid points around the given point according to exemplary embodiments.

FIG. 4 expresses each random variable at a given point in terms of 4 random variables at 4 grid points around the random variable (i.e., the given point). In FIG. 4, a point x is within a rectangle formed by 4 grid points (i, j), (i+1, j), (1, j+1), and (i+1, j+1). Also, in FIG. 4, another point u is expressed in terms of (m, n), (m+1, n), (m, n+1), and (m+1, n+1).

To calculate correlation between a random variable p(x) at point x and another random variable p(u) at another point u=(u, v) within a rectangle formed by four grid points $u_{m,n}$, $u_{m+1,n}$, $u_{m,n+1}$, and $u_{m+1,n+1}$, we first similarly express p(u) as a weighted linear combination of the four stochastic variables at the four grid points, $$p(u)=A_{m,n}(u)p_{m,n}+B_{m,n}(u)p_{m+1,n}+D_{m,n}(u)p_{m,n+1}+E_{m,n}(u)p_{m+1,n+1},\ x_m \leqq u \leqq x_{m+1},\ m=0,1,2,3,\ \ldots,\ I,\ y_n \leqq v \leqq y_{n+1},\ n=0,1,2,3,\ \ldots,\ J.\tag{2.10}$$

Then, we take a statistical average of a product of the two stochastic variables p(x) and p(u) and obtain the correlation coefficient between the two stochastic variables p(x) and p(u), i.e., the spatial correlation between the two points x and u. Thus obtained spatial correlation is a weighted linear combination of 4×4=16 discrete correlation coefficients, with each of the 16 correlation weights being a product of a weight function of the point x and a weight function of the point u, $$\begin{aligned} c(u, x) = c(x, u) \equiv \langle p(x)p(u)\rangle = {} & [A_{i,j}(x)c_{i,j;m,n} + B_{i,j}(x)c_{i+1,j;m,n} + D_{i,j}(x)c_{i,j+1;m,n} + E_{i,j}(x)c_{i+1,j+1;m,n}]A_{m,n}(u) + {} \\ & [A_{i,j}(x)c_{i,j;m+1,n} + B_{i,j}(x)c_{i+1,j;m+1,n} + D_{i,j}(x)c_{i,j+1;m+1,n} + E_{i,j}(x)c_{i+1,j+1;m+1,n}]B_{m,n}(u) + {} \\ & [A_{i,j}(x)c_{i,j;m,n+1} + B_{i,j}(x)c_{i+1,j;m,n+1} + D_{i,j}(x)c_{i,j+1;m,n+1} + E_{i,j}(x)c_{i+1,j+1;m,n+1}]D_{m,n}(u) + {} \\ & [A_{i,j}(x)c_{i,j;m+1,n+1} + B_{i,j}(x)c_{i+1,j;m+1,n+1} + D_{i,j}(x)c_{i,j+1;m+1,n+1} + E_{i,j}(x)c_{i+1,j+1;m+1,n+1}]E_{m,n}(u), \\ & x_i \le x \le x_{i+1},\ i = 0, 1, 2, 3, \ldots, I, \\ & y_j \le y \le y_{j+1},\ j = 0, 1, 2, 3, \ldots, J, \\ & x_m \le u \le x_{m+1},\ m = 0, 1, 2, 3, \ldots, I, \\ & y_n \le v \le y_{n+1},\ n = 0, 1, 2, 3, \ldots, J. \end{aligned}\tag{2.11}$$

The spatial correlation c(x, u) is a continuous function of x and u, and c(x, u) decreases monotonically with increasing |x−u| and/or increasing |y−v| for x and u. Point x is one component and point u is another component on the wafer, such that the spatial correlation c(x, u) is a continuous function of between component x and component u. When the ACV component of given discrete spatial correlation has a finite range, $$c_{i,j;m,n}=0,\ |i-m|\geqq M\ (M\geqq 2)\text{ or }|j-n|\geqq N\ (N\geqq 2), \tag{2.12}$$

the continuous spatial correlation c(x, u) also has a finite range (FIG. 4), $$c(x,u)=0,\ m-i\geqq M+1\ (1\leqq i\leqq m\leqq I-1)\text{ or }n-j\geqq N+1\ (1\leqq j<n\leqq J-1), \tag{2.13a}$$

$$c(x,u)=0,\ m-i\geqq M+2\ (i=0\text{ or }m=I)\text{ or }n-j\geqq N+2\ (j=0\text{ or }n=J). \tag{2.13b}$$

Figure 5:
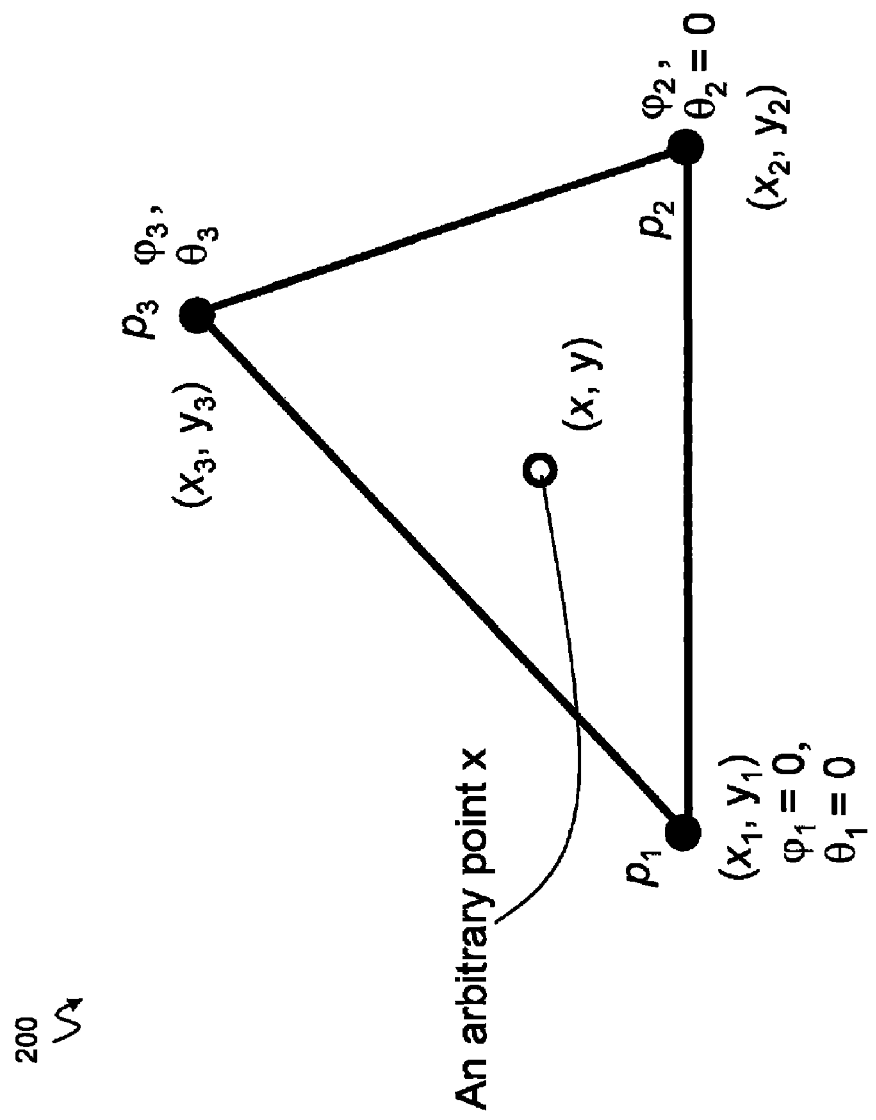
FIG. 5 illustrates interpolation within an arbitrary given triangle according to exemplary embodiments.

Appendix A: Interpolation among 3 random variables whose (x, y) locations form a triangle FIG. 5 illustrates interpolation within an arbitrary given triangle according to exemplary embodiments. In FIG. 5, 3 random variables located at vertices of the triangle are also given, and the correlation coefficients among the 3 random variables are also given and known. When correlation is discussed herein, correlation refers to the correlation coefficient between one point and another point.

Consider an arbitrary triangle formed by 3 corners $x_1$, $x_2$, and $x_3$, with a random variable $p_1$ located at $x_1$, another random variable $p_2$ located at $x_2$, and a third random variable $p_3$ sit at $x_3$. To be more general, we denote the three corner points of a triangle as $x_1=(x_1, y_1)$, $x_2=(x_2, y_2)$, and $x_3=(x_3, y_3)$, and also denote three mean-zero and normalized random variables as $p_1$ (located at $x_1$), $p_2$ (located at $x_2$), and $p_3$ (located at $x_3$) (see FIG. 6). Without loss of generality, these random variables have been normalized. Namely, they have normalization properties, $$\langle p_m\rangle=0,\ m=1,2,3, \tag{A1a}$$

$$\langle p_m^{\,2}\rangle=1,\ m=1,2,3. \tag{A1b}$$

The correlation coefficients among them are known and are denoted as $$r_{mn}\equiv\langle p_m p_n\rangle,\ -1\leqq r_{mn}<1,\ m,n=1,2,3,\ m\neq n. \tag{A2}$$

Namely, $r_{12}$ designates the correlation coefficient between the stochastic variable $p_1$ located at grid point 1 $(x_1, y_1)$ and the stochastic variable $p_2$ located at point 2 $(x_2, y_2)$. Similarly, $r_{13}$ designates the correlation coefficient between the stochastic variable $p_1$ located at grid point 1 $(x_1, y_1)$ and the stochastic variable $p_3$ located at point 3 $(x_3, y_3)$.

For an arbitrary point x within the triangle, the random variable at x is $$p(x)=h(x;Q)p_1+w(x;Q)p_2+z(x;Q)p_3,\ Q=\{r_{12},r_{13},r_{23},x_1,x_2,x_3\}, \tag{A3}$$

with $$h(x;Q)=\frac{\sin[\phi_2-\phi(x)]}{\sin\phi_2}\cos\theta(x)-\frac{\sin(\phi_2-\phi_3)}{\tan\theta_3\sin\phi_2}\sin\theta(x), \tag{A4a}$$

$$w(x;Q)=\frac{\cos\theta(x)\sin\phi(x)}{\sin\phi_2}-\frac{\sin\phi_3\sin\theta(x)}{\tan\theta_3\sin\phi_2}, \tag{A4b}$$

$$z(x;Q)=\frac{\sin\theta(x)}{\sin\theta_3}, \tag{A4c}$$

where $$\phi_2=\arccos r_{12}, \tag{A5a}$$

$$\phi_3=\arctan\frac{r_{23}-r_{12}r_{13}}{r_{13}\sqrt{1-r_{12}^2}}, \tag{A5b}$$

$$\theta_3=\arccos\sqrt{\frac{r_{13}^2+r_{23}^2-2r_{12}r_{13}r_{23}}{1-r_{12}^2}}. \tag{A5c}$$

When $r_{13}=0$ but $r_{23}\neq 0$, it follows from Equation (A5b) that $\Phi_3=\frac{1}{2}\pi$. When both $r_{13}=r_{23}=0$, it follows from Equation (A5c) that $\theta_3=\frac{1}{2}\pi$ but $\Phi_3$ is not well defined. In this case, we find that $\Phi_3=\frac{1}{2}\pi$ is a better choice.

It follows from Equations (A3) and (A1a) that the expectation value of p(x) is zero everywhere, $$\langle p(x)\rangle=0. \tag{A6}$$

The functions h(x), w(x), and z(x) have been carefully constructed such that the random variable p(x) remains normalized everywhere on and within the triangle, $$\langle p^2(x)\rangle=1,\text{ at least on the triangle and inside the triangle.} \tag{A7}$$

To see this property more clearly, we recast Equation (A3) in terms of three non-correlated and normalized random variables $e_1$, $e_2$, and $e_3$, $$p(x)=e_1\cos\theta(x)\cos\Phi(x)+e_2\cos\theta(x)\sin\Phi(x)+e_3\sin\theta(x), \tag{A8}$$

with $$e_1=p_1,\ e_2=\frac{p_2-r_{12}p_1}{\sqrt{1-r_{12}^2}},\quad e_3=\frac{p_3}{\sin\theta_3}-\frac{p_1\sin(\phi_2-\phi_3)+p_2\sin\phi_3}{\tan\theta_3\sin\phi_2}. \tag{A9}$$

It follows from Equations (A9) and (A1a) that the expectation value of each of three random variables $e_1$, $e_2$, and $e_3$ is zero, $$\langle e_m\rangle=0,\ m,n=1,2,3. \tag{A10}$$

It follows from Equations (A9), (A1b), and (A5) that each of three random variables $e_1$, $e_2$, and $e_3$ is normalized, and there are no correlation among them, $$\langle e_m e_n\rangle=\delta_{mn},\ m,n=1,2,3, \tag{A11}$$

where $\delta_{mn}$ is the Kronecker delta. In other words, $e_1$, $e_2$, and $e_3$ form a set of orthogonal and normalized random variables. Using Equations (A8) and (A11), it is straightforward to verify relation (A7), independent of the specific functional forms of θ(x) and ϕ(x).

In Equation (A4), angles θ(x) and ϕ(x) are functions of position x, and they are determined by x's coordinate (x, y) along with the locations $(x_1, y_1)$, $(x_2, y_2)$, and $(x_3, y_3)$ of the three random variables $p_1$, $p_2$, and $p_3$ and three angles $\phi_2$, $\phi_3$, and $\theta_3$. There are multiple sets of solutions. Each solution leads to the following properties. On three triangle corners, $$h(x_1;Q)=1,\ h(x_2;Q)=h(x_3;Q)=0;$$

$$w(x_1;Q)=w(x_3;Q)=0,\ w(x_2;Q)=1;$$

$$z(x_1;Q)=z(x_2;Q)=0,\ z(x_3;Q)=1. \tag{A12}$$

Thus, Equation (A3) reduces to the desired value at three triangle corners, $$p(x_1)=p_1,\ p(x_2)=p_2,\ p(x_3)=p_3. \tag{A13}$$

A preferred set of solution is such a set of solution which leads to the following properties: On the edge 12 of the triangle, $$p(x)=h(x;\ q_{12})p_1+w(x;\ q_{12})p_2,\ x=x_1+\lambda(x_2-x_1),\ 0\leqq\lambda\leqq1. \tag{A14a}$$

On the edge 13 of the triangle, $$p(x)=h(x;\ q_{13})p_1+z(x;\ q_{13})p_3,\ x=x_1+\lambda(x_3-x_1),\ 0\leqq\lambda\leqq1. \tag{A14b}$$

On the edge 23 of the triangle, $$p(x)=w(x;\ q_{23})p_2+z(x;\ q_{23})p_3,\ x=x_2+\lambda(x_3-x_2),\ 0\leqq\lambda\leqq1. \tag{A14b}$$

In Equation (A14), $$q_{mn}=\{r_{mn},x_m,x_n\},\ m,n=1,2,3. \tag{A15}$$

Figure 6:
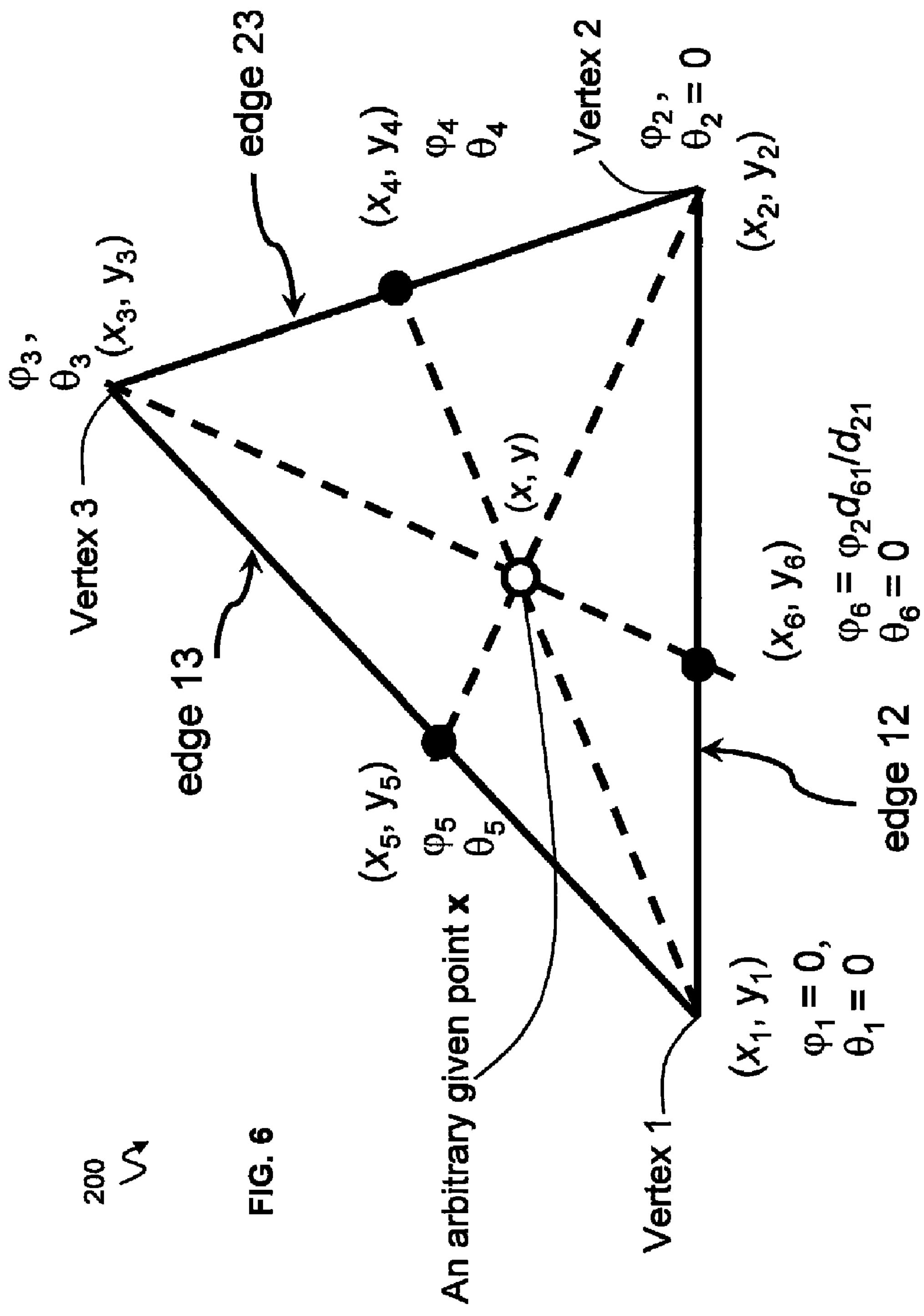
FIG. 6 illustrates a method for determining angles $\theta(x)$ and $\phi(x)$ of an arbitrary given point using one-dimensional interpolation methods multiple times according to exemplary embodiments.

The set of solution given below is such a set of solution. $\theta(x)$ and $\phi(x)$ solution is below:

FIG. 6 illustrates a method of determining angles $\theta(x)$ and $\phi(x)$ and builds upon the triangle in FIG. 5 according to exemplary embodiments.

(i). The approach first draws a straight line from vertex 1 of the triangle to point x and extends it to intersect with edge 23; we call the cross point ($x_4$, $y_4$) (see FIG. 6). The cross point ($x_4$, $y_4$) satisfies two linear algebraic equations, $$y_4-y_2=k_{23}(x_4-x_2),\ k_{23}=\frac{y_3-y_2}{x_3-x_2}, \tag{A16a}$$

$$y_4-y_1=k_1(x_4-x_1),\ k_1=\frac{y-y_1}{x-x_1}. \tag{A16b}$$

Its solution ($x_4$, $y_4$) can be found easily. Then the method plots a second straight line from vertex 2 of the triangle to point x and extends it to intersect with edge 13; we call the cross point ($x_5$, $y_5$). The cross point ($x_5$, $y_5$) satisfies two linear algebraic equations, $$y_5-y_1=k_{13}(x_5-x_1),\ k_{13}=\frac{y_3-y_1}{x_3-x_1}, \tag{A17a}$$

$$y_5-y_2=k_1(x_5-x_2),\ k_2=\frac{y-y_2}{x-x_2}. \tag{A17b}$$

Its solution ($x_5$, $y_5$) can be found easily. Last, the method draws a third straight line from vertex 3 of the triangle to point x and extends it to intersect with edge 12; we call the cross point ($x_6$, $y_6$). The cross point ($x_6$, $y_6$) satisfies two linear algebraic equations, $$y_6-y_1=k_{12}(x_6-x_1),\ k_{12}=\frac{y_2-y_1}{x_2-x_1}. \tag{A18a}$$

$$y_6-y_3=k_3(x_6-x_3),\ k_3=\frac{y-y_3}{x-x_3}. \tag{A18b}$$

Its solution ($x_6$, $y_6$) can be found.

(ii). The approach then finds $\phi$ and $\theta$ values of points ($x_4$, $y_4$), ($x_5$, $y_5$), and ($x_6$, $y_6$) using a one-dimensional interpolation method. For point ($x_6$, $y_6$) on edge 12, its angle $\phi_6$ is interpolated between $\phi_1=0$ at vertex 1 and $\phi_2$ at vertex 2, and is proportional to its distance to vertex ($x_1$, $y_1$) and is maximized at $\phi_2$ when it reaches vertex ($x_2$, $y_2$), $$\Phi_6=\Phi_2 d_{61}/d_{21}, \tag{A19a}$$

its another angle $\theta_6$ is interpolated between $\theta_1=0$ at vertex 1 and $\theta_2=0$ at vertex 2 and thus is also zero, $$\theta_6=0. \tag{A19b}$$

In Equation (A19a), $d_{mn}$ is the distance between the $m^{th}$ and $n^{th}$ points, $$d_{mn}=\sqrt{(x_m-x_n)^2+(y_m-y_n)^2},\ m,n=1,2,\ldots,6. \tag{A20}$$

For point ($x_5$, $y_5$) on edge 13, the values of $\phi_5$ and $\theta_5$ are interpolated by using the solution in Appendix B [Equation (B7)], $$\{\theta_5,\Phi_5\}=F(x_1,y_1,x_3,y_3,x_5,y_5,0,0,\Phi_2). \tag{A21}$$

For point ($x_4$, $y_4$) on edge 23, the values of $\phi_4$ and $\theta_4$ are also interpolated by using the solution in Appendix B, $$\{\theta_4,\Phi_4\}=F(x_2,y_2,x_3,y_3,x_4,y_4,\Phi_2,\theta_3,\Phi_3). \tag{A22}$$

(iii). Next the approach finds $\phi$ and $\theta$ values at point x using a one-dimensional interpolation method again. There are 3 pairs of such values. Using the vertex 1 of the triangle and edge point ($x_4$, $y_4$) and the interpolation solutions in Appendix B, one has $$\{\theta_{14},\Phi_{14}\}=F(x_1,y_1,x_4,y_4,x,y,0,\theta_4,\Phi_4). \tag{A23}$$

Using the vertex 2 of the triangle and edge point ($x_5$, $y_5$) and the interpolation solutions in Appendix B, one gets $$\{\theta_{25},\Phi_{25}\}=F(x_2,y_2,x_5,y_5,x,y,\Phi_2,\theta_5,\Phi_5). \tag{A24}$$

Using the vertex 3 of the triangle and edge point ($x_6$, $y_6$) and the interpolation solutions in Appendix B, one obtains $$\{\theta_{36},\Phi_{36}\}=F(x_6,y_6,x_3,y_3,x,y,\Phi_6,\theta_3,\Phi_3). \tag{A25}$$

Finally the method takes an average of three $\phi$ values $\phi_{14}$, $\phi_{25}$, and $\phi_{36}$ as the final $\phi$ value of point x, $$\Phi(x)=(\Phi_{14}+\Phi_{25}+\Phi_{36})/3, \tag{A26a}$$

and also takes an average of three $\theta$ values $\theta_{14}$, $\theta_{25}$, and $\theta_{36}$ as the final $\theta$ value of point x, $$\theta(x)=(\theta_{14}+\theta_{25}+\theta_{36})/3. \tag{A26b}$$

Alternatively, one can use a weighted average of $\phi^{14}$, $\phi_{25}$, and $\phi_{14}$ as $\phi$, and use a weighted average of $\theta_{14}$, $\theta_{25}$, and $\theta_{36}$ as $\theta$. In summary, the solution for interpolating among 3 random variables whose (x, y) locations form a triangle is given by Equations (A3)-(A5) and Equations (A16)-(A26).

Appendix B: Angle solution for interpolating two spatially correlated random variables.

Consider a random variable $p_a$ located at ($x_a$, $y_a$) and another random variable $p_b$ located at ($x_b$, $y_b$). The angles $\phi_a$ and $\theta_a$(=0) of $p_a$ are known, and the angles $\phi_b$ and $\theta_b$ of $p_b$ are also known. Given an arbitrary point (x, y) located on the straight line connecting two points ($x_a$, $y_a$) and ($x_b$, $y_b$), we provide an interpolation solution for the angles $\phi$ and $\theta$ of point (x, y).

The correlation coefficient between the two random variables $p_a$ and $p_b$ are determined by three angles $\phi_a$, $\phi_b$, and $\theta_b$, $$r_{ab}=\cos\theta_b\cos(\Phi_a-\Phi_b). \tag{B1}$$

Then, the values of $\phi$ and $\theta$ are determined in three steps. In step 1, one makes the point's angle to $p_a$ be proportional to its distance to point ($x_a$, $y_a$) and also being maximized at arccos ($r_{ab}$) when it reaches point ($x_b$, $y_b$), $$\alpha = \sqrt{\frac{(x-x_a)^2+(y-y_a)^2}{(x_b-x_a)^2+(y_b-y_a)^2}}\arccos(r_{ab}). \tag{B2}$$

In step 2, one determines the components of a 3D unit vector p (or, say, the coordinates of a point p on a unit sphere in a three-dimensional space), $$p_x = q_x \cos\Phi_a - q_y \sin\Phi_a,$$

$$p_y = q_x \sin\Phi_a + q_y \cos\Phi_a,$$

$$p_z = \sin\alpha \sin\Psi, \tag{B3}$$

where $$q_x = \cos\alpha,$$
$$q_y = \sin\alpha\cos\psi, \tag{B4}$$

$$\psi = \arctan\frac{\tan\theta_b}{\sin(\phi_b-\phi_a)},\ 0 \le \psi \le \pi. \tag{B5}$$

In step 3, one determines the values of $\phi$ and $\theta$ by using the components of the unit vector p, $$\theta = \arccos p_z,\ \phi = \arcsin\frac{p_y}{\cos\theta}\ \text{or}\ \phi = \arccos\frac{p_x}{\cos\theta}. \tag{B6}$$

Solutions (B1)-(B6) can be expressed in terms of a function:

$$\{\theta,\Phi\} = F(x_a,y_a,x_b,y_b,x,y,\Phi_a,\theta_b,\Phi_b). \tag{B7}$$

Note that each step, calculation, and operation discussed for point x, applies by analogy to point u. For conciseness, each every formula and calculation applied for point x is not shown for point u. Given the teaching of the present disclosure, one skilled in the art can apply each formula to point u without undue experimentation.

Now turning to FIG. 7. FIG. 7 illustrates a flow chart 700 for making a discrete spatial correlation (for two components) defined on a two-dimensional grid (wafer) into a continuous spatial correlation for the two components according to exemplary embodiments. Also, for each quadrilateral (rectangle) on the two-dimensional grid, FIG. 7 illustrates how to make the spatial correlation coefficient as a continuous function (instead of a step function) of the coordinates of a point (physical component, such as a circuit) in that quadrilateral (rectangle) relative to another point (physical component, such as another circuit) in another quadrilateral (rectangle), such as two points shown in FIG. 4.

Application 80 is configured to implement the operations of the flow chart 700 along with each method discussed herein. The application 80 can automatically execute the operations, can be instructed to execute the operations, and/or can cooperatively be instructed and automatically execute the operations and methods discussed herein, which includes equations and formulas.

The application 80 receives identification of a two-dimensional region within which a two-dimensional continuous spatial correlation is desired at operation 705. Each given point in the two-dimensional region has a discrete stochastic variable. The rectangle in FIG. 2A is an example of a two-dimensional region, and the two-dimensional region can be of any shape, including any irregular boundary shape.

The application 80 is configured to establish additional grid points on the boundary and corners of the two-dimensional region to enclose the two-dimensional region (FIG. 2B) at operation 710. In one embodiment for a Manhattan grid (i.e., a 2D regular grid), the application 80 is configured to apply Equations (1.5), (1.11), (1.15), (1.21), (1.25), and (1.27).

The application 80 is configured to find a stochastic (i.e., random) variable at each of the additional discrete grid points on the boundary and corners of the two-dimensional region using a one-dimensional extrapolation method for correlated random variables at operation 715. For a Manhattan grid, the application 80 is configured to apply Equations (1.6), (1.12), (1.16), (1.22), (1.26), and (1.28).

The application 80 is configured to obtain all correlation coefficients among the initially given and added discrete stochastic variables at operation 720. The application 80 is configured to apply Equation (1.35), with Equations (0.4), (1.16), (1.12), (1.16), (1.22), (1.26), and (1.28).

For an arbitrarily given point x within the two-dimensional region, the application 80 is configured to first identify four grid points ($x_{i,j}$, $x_{i+1,j}$, $x_{i,j+1}$, $x_{i+1,j+1}$) such that a quadrilateral formed by the four grid points encloses the given point (including on the boundary of the quadrilateral), and then develop a continuous function p(x) for a stochastic variable at the given point in terms of the four discrete stochastic variables at the four grid points [FIG. 4 and Equation (2.1)] at operation 725. The same is performed for point u to develop a continuous function p(u).

For a pair of arbitrarily given points (x and u) within the two-dimensional region, the application 80 is configured to express their correlation coefficient in terms of 4×4=16 discrete correlation coefficients among discrete stochastic variables, a set of continuous functions of the coordinate of one of given point x, and another set of continuous functions of the coordinate of the other given point u [Equation (2.11)] at operation 730.

FIG. 8 is a block diagram 800 following from FIG. 7 according to exemplary embodiments.

The continuous function p(x) [Equation (2.1)] for the stochastic variable has been developed by the application 80 from block 805. The application 80 is configured to develop the continuous function p(x) with the following characteristics such that it: reduces to the discrete random variable at a grid point [Equation (2.4)] at block 810; remains a constant expectation value everywhere [Equation (2.2)] at block 815; maintains a constant standard deviation (or, equivalently, a constant variance) everywhere [Equation (2.3)] 820; and when a point x is on a line segment connecting two grid points, the continuous function p(x) depends only on the coordinates of the two grid points and on the two discrete random variables at the two grid points [Equation (2.5)] at block 825.

Further, to find a discrete stochastic variable at an edge point of the two-dimensional region, the application 80 is configured to extrapolate from two given discrete stochastic variables at two nearby given grid points. The two nearby given grid points were originally in FIG. 2A.

To find a discrete stochastic variable at a corner grid point of the two-dimensional region, the application 80 is configured to extrapolate from two known discrete stochastic variables at two nearby grid points, where the two grid points are on the boundary. For example, for the corner point (0, 0) in FIG. 2B, the boundary grid points for extrapolation are (0, 1) and (1, 0).

The quadrilateral is formed by four grid points comprising $x_{i,j}$, $x_{i+1,j}$, $x_{i,j+1}$, and $x_{i+1,j+1}$ for the point x, and the quadrilateral is divided into two triangles (a first triangle and a second triangle).

The application 80 determines the values of the set of four continuous weight functions of the point x by finding which one of the two triangles includes the point x. The application 80 determines values of three continuous weight functions h(x), w(x), and z(x) of the set of four continuous weight functions by using coordinates of the three vertices of the triangle and by using the three discrete correlation coefficients among three random variables located at the three vertices of the triangle. The application 80 sets a value of a fourth continuous weight function of the set of continuous weight functions to zero.

The application 80 determines values of the three continuous weight functions h(x), w(x), and z(x) of the set of four continuous weight functions using coordinates of the three vertices of the triangle and using the three discrete correlation coefficients among three random variables located at the three vertices of the triangle. The application 80 draws a straight line from a vertex at $x_1$ of the triangle to point x, extending the line to intersect a first edge of the triangle at $x_4$, and finding the random variable at the intersection point $x_4$. The application 80 draws a second straight line from a second vertex at $x_2$ of the triangle to point x, extending the line to intersect a second edge of the triangle at $x_5$, and finding the random variable at the intersection point $x_5$. The application 80 draws a third straight line from a third vertex $x_3$ of the triangle to point x, extending the line to intersect the last edge of the triangle at $x_6$, and finding the random variable at the intersection point $x_6$.

The application 80 defines the two-dimensional grid on the wafer 200. The point x is a first circuit (or component) on the wafer 200 and the point u is a second circuit (or component) on the wafer 200 in which continuous spatial correlation is needed/desired, from discrete spatial correlation at each circuit. The weighted linear combination of the 16 discrete correlation coefficients is between the first circuit and the second circuit, and the weighted linear combination of the 16 discrete correlation coefficients are utilized to predict and determine affects of across chip variations on the wafer 200.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method on a computer for making a discrete spatial correlation defined on a two-dimensional grid continuous, comprising:

identifying, by the computer, a two-dimensional region within which a two-dimensional continuous spatial correlation is desired, wherein the two-dimensional region has given grid points and each of the given grid points has its given discrete stochastic variable;

establishing additional discrete grid points on the boundary and corners of the two-dimensional region to enclose the two-dimensional region;

finding a stochastic variable, being a random variable, at each of the additional discrete grid points on the boundary and corners of the two-dimensional region using a one-dimensional extrapolation method for correlated random variables, such that each of the additional grid points has a discrete stochastic variable represented as additional discrete stochastic variables;

obtaining all correlation coefficients among the given discrete stochastic variables and the additional discrete stochastic variables;

forming a continuous stochastic function by a process for an arbitrarily given point within the two-dimensional region, the process for forming the continuous stochastic function comprising:

identifying four grid points such that a quadrilateral formed by the four grid points encloses the arbitrarily given point;

expressing the stochastic variable at the arbitrarily given point as a weighted linear combination of the four discrete stochastic variables at the four grid points; and developing each of four weights of the weighted linear combination as a continuous function of the coordinate of the point.

2. The method of claim 1, further comprising taking a statistical average of a product of a continuous stochastic function p(x) for a point x and a continuous stochastic function p(u) for a point u at two arbitrarily given points within the two-dimensional region; and obtaining a spatial correlation coefficient between the points x and u as a continuous function of coordinates of the points x and u;

wherein the continuous function of coordinates of the points x and u is a weighted linear combination of 16 discrete correlation coefficients; and wherein each of 16 weights of the 16 discrete correlation coefficients is formed by multiplying one of 4 continuous weight functions of the point x with one of 4 continuous weight functions of the point u.

3. The method of claim 2, wherein the continuous function p(x) for the discrete stochastic variable of the point x:

reduces to its discrete random variable at the point x;

remains a constant expectation value everywhere in the two-dimensional region;

maintains a constant standard deviation everywhere in the two-dimensional region; and for the point x on a line segment connecting two grid points, depends only on the coordinates of the two grid points and the discrete random variables at the two grid points.

4. The method of claim 1, wherein finding a discrete stochastic variable at an edge point of the two-dimensional region comprises extrapolating from two given discrete stochastic variables at two nearby given grid points.

5. The method of claim 1, wherein finding a discrete stochastic variable at a corner point of the two-dimensional region comprises extrapolating from two known discrete stochastic variables at two nearby grid points.

6. The method of claim 2, wherein a quadrilateral is formed by four grid points comprising $x_{i,j}$, $x_{i+1,j}$, $x_{i,j+1}$, and $x_{i+1,j+1}$ for the point x; and wherein the quadrilateral is divided into two triangles being a first triangle and a second triangle.

7. The method of claim 6, wherein values of the 4 continuous weight functions of the point x are determined by:

finding which one of the two triangles includes the point x;

determining values of three continuous weight functions h(x), w(x), and z(x) of the 4 continuous weight functions by using coordinates of the three vertices of the triangle and by using the three discrete correlation coefficients among three random variables located at the three vertices of the triangle; and setting a value of a fourth continuous function of the 4 continuous weight functions to zero.

8. The method of claim 2, wherein a quadrilateral is formed by four grid points comprising $u_{m,n}$, $u_{m+1,n}$, $u_{m,n+1}$, and $u_{m+1,n+1}$ for the point u;

wherein the quadrilateral is divided into two triangles being a first triangle and a second triangle; and wherein values of the 4 continuous weight functions of the point u are determined by:

finding which one of the two triangles includes the point u, determining values of three continuous weight functions h(u), w(u), and z(u) of the 4 continuous weight functions by using coordinates of the three vertices of the triangle and by using the three discrete correlation coefficients among three random variables located at the three vertices of the triangle; and setting a value of a fourth continuous weight function of the 4 continuous weight functions to zero.

9. The method of claim 7, wherein determining the values of the three continuous weight functions h(x), w(x), and z(x) of the 4 continuous weight functions using coordinates of the three vertices of the triangle and using the three discrete correlation coefficients among three random variables located at the three vertices of the triangle comprises:

drawing a straight line from a vertex at $x_1$ of the triangle to point x, extending the line to intersect a first edge of the triangle at $x_4$, finding the random variable at the intersection point $x_4$, and finding a first random variable at point x;

drawing a second straight line from a second vertex at $x_2$ of the triangle to point x, extending the line to intersect a second edge of the triangle at $x_5$, finding the random variable at the intersection point $x_5$, and finding a second random variable at point x;

drawing a third straight line from a third vertex $x_3$ of the triangle to point x, extending the line to intersect the last edge of the triangle at $x_6$, finding the random variable at the intersection point $x_6$, and finding a third random variable at point x; and using the first random variable at point x, the second random variable at point x, the third random variable at point x, or an average among the first, second, and third random variables at point x as a final random variable at point x.

10. The method of claim 1, wherein the two-dimensional grid is on a wafer.

11. The method of claim 1, wherein the point x is a first circuit on a wafer and the point u is a second circuit on the wafer.

12. The method of claim 11, wherein the weighted linear combination of the 16 discrete correlation coefficients is between the first circuit and the second circuit and are utilized to predict affects of across chip variations on the wafer.

13. An apparatus for making a discrete spatial correlation defined on a two-dimensional grid continuous, comprising:

memory for storing a program; and a processor, functionally coupled to the memory, the processor being responsive to computer-executable instructions contained in the program and operative for:

identifying a two-dimensional region within which a two-dimensional continuous spatial correlation is desired, wherein the two-dimensional region has given grid points and each of the given grid points has its given discrete stochastic variable;

establishing additional discrete grid points on the boundary and corners of the two-dimensional region to enclose the two-dimensional region;

finding a stochastic variable, being a random variable, at each of the additional discrete grid points on the boundary and corners of the two-dimensional region using a one-dimensional extrapolation method for correlated random variables, such that each of the additional grid points has a discrete stochastic variable represented as additional discrete stochastic variables;

obtaining all correlation coefficients among the given discrete stochastic variables and the additional discrete stochastic variables;

forming a continuous stochastic function by a process for an arbitrarily given point within the two-dimensional region, the process for forming the continuous stochastic function comprising:

identifying four grid points such that a quadrilateral formed by the four grid points encloses the arbitrarily given point;

expressing the stochastic variable at the arbitrarily given point as a weighted linear combination of the four discrete stochastic variables at the four grid points; and developing each of four weights of the weighted linear combination as a continuous function of the coordinate of the point.

14. The apparatus of claim 13, further comprising taking a statistical average of a product of a continuous stochastic function p(x) for a point x and a continuous stochastic function p(u) for a point u at two arbitrarily given points within the two-dimensional region; and obtaining a spatial correlation coefficient between the points x and u as a continuous function of coordinates of the points x and u;

wherein the continuous function of coordinates of the points x and u is a weighted linear combination of 16 discrete correlation coefficients; and wherein each of 16 weights of the 16 discrete correlation coefficients is formed by multiplying one of 4 continuous weight functions of the point x with one of 4 continuous weight functions of the point u.

15. The apparatus of claim 14, wherein the continuous function p(x) for the discrete stochastic variable of the point x:

reduces to its discrete random variable at the point x;

remains a constant expectation value everywhere in the two-dimensional region;

maintains a constant standard deviation everywhere in the two-dimensional region; and for the point x on a line segment connecting two grid points, depends only on the coordinates of at the two grid points and the discrete random variables at the two grid points.

16. The apparatus of claim 14, wherein finding a discrete stochastic variable at an edge point of the two-dimensional region comprises extrapolating from two given discrete stochastic variables at two nearby given grid points.

17. The apparatus of claim 13, wherein finding a discrete stochastic variable at a corner point of the two-dimensional region comprises extrapolating from two known discrete stochastic variables at two nearby grid points.

18. The apparatus of claim 14, wherein a quadrilateral is formed by four grid points comprising $x_{i,j}$, $x_{i+1,j}$, $x_{i,j+1}$, and $x_{i+1,j+1}$ for the point x; and wherein the quadrilateral is divided into two triangles being a first triangle and a second triangle.

19. A computer program product for making a discrete spatial correlation defined on a two-dimensional grid continuous, the computer program product comprising:

a computer readable storage medium having computer readable program code embodied therewith, the computer readable program code comprising:

identifying a two-dimensional region within which a two-dimensional continuous spatial correlation is desired, wherein the two-dimensional region has given grid points and each of the given grid points has its given discrete stochastic variable;

establishing additional discrete grid points on the boundary and corners of the two-dimensional region to enclose the two-dimensional region;

finding a stochastic variable, being a random variable, at each of the additional discrete grid points on the boundary and corners of the two-dimensional region using a one-dimensional extrapolation method for correlated random variables, such that each of the additional grid points has a discrete stochastic variable represented as additional discrete stochastic variables;

obtaining all correlation coefficients among the given discrete stochastic variables and the additional discrete stochastic variables;

forming a continuous stochastic function by a process for an arbitrarily given point within the two-dimensional region, the process for forming the continuous stochastic function comprising:

identifying four grid points such that a quadrilateral formed by the four grid points encloses the arbitrarily given point;

expressing the stochastic variable at the arbitrarily given point as a weighted linear combination of the four discrete stochastic variables at the four grid points; and developing each of four weights of the weighted linear combination as a continuous function of the coordinate of the point.

20. The product of claim 19, further comprising taking a statistical average of a product of a continuous stochastic function p(x) for a point x and a continuous stochastic function p(u) for a point u at two arbitrarily given points within the two-dimensional region; and obtaining a spatial correlation coefficient between the points x and u as a continuous function of coordinates of the points x and u;

wherein the continuous function of coordinates of the points x and u is a weighted linear combination of 16 discrete correlation coefficients; and wherein each of 16 weights of the 16 discrete correlation coefficients is formed by multiplying one of 4 continuous weight functions of the point x with one of 4 continuous weight functions of the point u.

* * * * *